United States Patent [19]

Okuyama et al.

[11] Patent Number: 5,636,062
[45] Date of Patent: Jun. 3, 1997

[54] APPARATUS FOR DRIVING A LENS

[75] Inventors: Takeshi Okuyama; Hirotake Nozaki, both of Yokohama; Koutarou Murakami, Kawasaki, all of Japan

[73] Assignee: Nikon Corporation, Tokyo, Japan

[21] Appl. No.: 165,316

[22] Filed: Dec. 13, 1993

[30] Foreign Application Priority Data

| Dec. 14, 1992 | [JP] | Japan | 4-333165 |
| Jun. 15, 1993 | [JP] | Japan | 5-168702 |
| Jun. 15, 1993 | [JP] | Japan | 5-168703 |
| Jun. 15, 1993 | [JP] | Japan | 5-168704 |
| Sep. 21, 1993 | [JP] | Japan | 5-257812 |
| Sep. 21, 1993 | [JP] | Japan | 5-257813 |
| Sep. 21, 1993 | [JP] | Japan | 5-257814 |

[51] Int. Cl.$^6$ ............................................. G02B 7/02
[52] U.S. Cl. ........................................... 359/700; 359/823
[58] Field of Search ................................. 359/694, 699, 359/700, 823, 822, 828

[56] References Cited

U.S. PATENT DOCUMENTS 3,051,048  8/1962  Mahn ........................................ 359/694

Primary Examiner—Georgia Y. Epps
Assistant Examiner—Thomas Robbins

[57] ABSTRACT

Disclosed is an apparatus for driving a lens, having first and second movable lens groups movable along an optic-axis direction, a crank member for moving the first and second movable lens groups along the optic-axis direction in a predetermined mutual relationship, a first moving member for moving the first movable lens group along the optic-axis direction by a force received from the crank member, a second moving member for moving the second movable lens group along the optic-axis direction by the force received by the crank member and a compensating device, disposed between the second movable lens group and the second moving member, for compensating a deviation quantity of the second movable lens group from a predetermined moving quantity.

46 Claims, 22 Drawing Sheets

VARIATION OF POSITION OF MOVABLE
LENS GROUP 2 RELATIVE TO POSITION
OF MOVABLE LENS GROUP 1 BY
ADJUSTING CAM PLATE

ADJUSTMENT DIRECTION OF CAM PLATE
FOR COMPENSATING

AMOUNT OF ADJUSTMENT
OF CAM FOLLOWER

APPARATUS FOR DRIVING A LENS

BACKGROUND OF THE INVENTION

1. Field of the Invention

The present invention relates to a lens driving apparatus disposed for moving lens groups in an enlarger, a telescope and a microscope, etc., and more particularly, to a lens driving apparatus for moving a plurality of movable lens groups such as zoom lens, etc., in a predetermined relationship.

2. Related Background Art

A cylindrical cam has generally hitherto been employed for driving and positioning the movable lens groups in predetermined positions in the enlarger, the telescope and the microscope, etc.. A lens position is controlled by regulating a rotary angle of the cylindrical cam.

If the movable lens groups are required to move at a high speed, a feed screw is also employed in place of the cylindrical cam.

When driving the movable lens group by use of the cylindrical cam, however, it is required that the cylindrical cam be rotated. Hence, a loss in driving force is large, and a loss due to frictions is also large. A problem is therefore a difficulty of correspondance to a high durability and a high-speed drive of the movable lens group.

Further, working the cylindrical cam is difficult and requires high costs. Besides, there arises a problem, wherein if the cylindrical cam is once worked, modification and compensation after assembly are arduous.

On the other hand, when driving the movable lens group by use of the feed screw, driving sources are needed for the plurality of movable lens groups, respectively. Moreover, the respective movable lens groups are moved precisely and correlatively. This requires control for correlating the movable lens groups, resulting in a problem such that the structure increases in costs and becomes complicated.

Additionally, in the case of the feed screw, the movable lens group can be driven at a high velocity. The feed screw itself is, however, expensive. Besides, the feed screw presents a problem in which moving members impinge on each other, or the moving member collides with a fixing member at both ends of a movable range of the lens groups due to inconvenience or the like in terms of driving control.

Then, a stop position accuracy can not be, as a matter of course, be ensured in such a case. There arises, however, a problem wherein an element for absorbing the impact and stopping them is needed to prevent a mechanism from being broken.

Now, it is considered that the lens groups are drive by employing a link mechanism. In this case, however, there exists a problem in which a moving quantity of the movable lens group is hard to adjust.

SUMMARY OF THE INVENTION

It is a primary object of the present invention, which has been devised to obviate the problems inherent in the prior arts, to provide a lens driving apparatus capable of quickly and surely moving movable lens groups.

According to one aspect of the present invention, there is provided a lens driving apparatus for moving a second movable lens group along an optic-axis direction in a predetermined relationship with a first movable lens group moved along the optic-axis direction. The lens driving apparatus comprises a first moving device for moving the first movable lens group along the optic-axis direction, a second moving device for moving the second movable lens group along the optic-axis direction and a compensating device for compensating a deviation of a moving quantity of the second movable lens group moved by the second moving device from a predetermined moving quantity.

In the lens driving apparatus of this invention, the first moving device moves the first movable lens group. The second moving device moves the second movable lens group.

Then, the compensating device compensates the deviation of the moving quantity of the second movable lens group from the predetermined moving quantity.

The lens driving apparatus is capable of highly accurate positioning irrespective of a lens position.

To accomplish the above object, the lens driving apparatus comprises: first and second movable lens groups; a support element for supporting the first and second movable lens groups so as to be movable in the optic-axis direction through first and second slide members; a first moving device for moving the first movable lens group, a slider crank mechanism being constructed of the first slide member and a crank member linked via a first link member to the first slide member; a driving device for rotationally driving the crank member; a second moving device for moving the second movable lens group to an approximate position, a slider crank mechanism being constructed of the second slide member and the crank member linked via a second link member to the second slide member; and a compensating device for compensating a moving position of the second movable lens group to a normal position by causing a driven member engaging with the second link member to be driven by a compensation cam member assuming a predetermined configuration. The lens driving apparatus further comprises a position adjusting device for adjusting a fitting position of the first slide member to the first link member and/or a fitting position of the second slide member to the second link member or the driven member.

According to the lens driving apparatus described above, the position adjusting device is capable of adjusting the fitting position of the first slider member to the first link member and/or the fitting position of the second slider member to the second link member or the driven member in the optic-axis direction. Therefore, the movable lens group can be adjusted in the optic-axis direction only by adjusting the fitting position.

In the above lens driving apparatus, another lens driving apparatus according to this invention further comprises an amount-of-compensation storing device for storing an amount of compensation of a fitting position of the first slider member to the first link member which corresponds to a position of the first movable lens group and/or a fitting position of the second slider member to the second link member or the driven member; and a positional adjustment driving device for driving the position adjusting device on the basis of the amount of compensation that is stored in the amount-of-compensation storing device.

According to the above lens driving apparatus, the amount-of-compensation storing device stores, at necessary intervals, the amount of compensation of the fitting position of the first slider member to the first link member and/or the fitting position of the second slider member to the second link member or the driven member, the amount of compensation being needed for determining a position of the first movable lens group relative to a crank position and a position of the second movable lens group relative to a position of the first movable lens group. The positional adjustment driving device is capable of adjusting the fitting position through the position adjusting device in accordance with the amount of compensation.

In the above lens driving apparatus, still another lens driving apparatus according to this invention further comprises: a temperature detecting device for detecting a temperature of an environment used. The amount-of-compensation storing device stores an amount of compensation with respect to each temperature. The positional adjustment driving device drives the position adjusting device on the basis of the amount of compensation corresponding to the temperature detected by the temperature detecting device.

According to the above lens driving apparatus, the temperature is measured by the temperature detecting device. The positional adjustment driving device is capable of driving the position adjusting device on the basis of the amount of compensation to give an optimum value at that temperature. Accordingly, the fitting position is adjustable even after an assembly adjustment. It is therefore possible to deal with dimensional variations produced after a final adjustment due to changes in the temperature of the environment used.

A further lens driving apparatus according to this invention comprises: first and second movable lens groups; a support element for supporting the first and second movable lens groups so as to be movable in the optic-axis direction through first and second slide members; a first moving device for moving the first movable lens group, a slider crank mechanism being constructed of the first slide member and a crank member linked via a first link member to the first slide member; a driving device for rotationally driving the crank member; a second moving device for moving the second movable lens group to an approximate position, a slider crank mechanism being constructed of the second slide member and the crank member linked via a second link member to the second slide member; and a compensating device for compensating a moving position of the second movable lens group to a normal position by causing a driven member engaging with the second link member to be driven by a compensation cam member assuming a predetermined configuration. The lens driving apparatus further comprises a length adjusting device for adjusting a length of the first and/or second link member.

According to the above lens driving apparatus, the length adjusting device is capable of adjusting the length of the first and/or second link member. Therefore, a deviation caused by a manufacturing error of each member can be compensated for every member.

In the above lens driving apparatus, a still further lens driving apparatus according to this invention further comprises: an amount-of-compensation storing device for storing an amount of compensation of a length of the first and/or second link member which corresponds to a position of the first movable lens group; and a length adjustment driving device for driving the length adjusting device on the basis of the amount of compensation stored in the amount-of-compensation storing device.

According to the above lens driving apparatus, the amount-of-compensation storing device stores, at necessary intervals, the amount of compensation of the first and/or second link member that is needed for determining a position of the second movable lens group relative to a position of the first movable lens group. The length adjustment driving device is capable of adjusting the length of the first and/or second link member through the length adjusting device in accordance with the amount of compensation.

In the above lens driving apparatus, a yet further lens driving apparatus further comprises: a temperature detecting device for detecting a temperature of an environment used. The amount-of-compensation storing device stores an amount of compensation with respect to each temperature. The length adjustment driving device drives the length adjusting device on the basis of the amount of compensation corresponding to the temperature detected by the temperature detecting device.

According to the above lens driving apparatus, the temperature is measured by the temperature detecting device. The length adjustment driving device is capable of driving the length adjusting device on the basis of the amount of compensation to give an optimum value at that temperature. Accordingly, the length of the first and/or second link member is adjustable even after an assembly adjustment. It is therefore possible to deal with dimensional variations produced after a final adjustment due to changes in the temperature of the environment used.

An additional lens driving apparatus comprises: first and second movable lens groups; a support element for supporting the first and second movable lens groups so as to be movable in the optic-axis direction through first and second slide members; a first moving device for moving the first movable lens group, a slider crank mechanism being constructed of the first slide member and a crank member linked via a first link member to the first slide member; a driving device for rotationally driving the crank member; a second moving device for moving the second movable lens group to an approximate position, a slider crank mechanism being constructed of the second slide member and the crank member linked via a second link member to the second slide member; and a compensating device for compensating a moving position of the second movable lens group to a normal position by causing a driven member engaging with the second link member to be driven by a compensation cam member assuming a predetermined configuration. The lens driving apparatus further comprises an amount-of-compensation storing device for storing an amount of compensation of the compensation cam member which corresponds to a position of the first movable lens group. The lens driving apparatus also comprises a compensation cam member driving device for driving the compensation cam member on the basis of the amount of compensation stored in the amount-of-compensation storing device.

According to the above lens driving apparatus, the amount-of-compensation storing device stores, at necessary intervals, the amount of compensation of the compensation cam member that is needed for determining a position of the second movable lens group relative to a position of the first movable lens group. The compensation cam member driving device is capable of driving the compensation cam member in accordance with the amount of compensation. Besides, when the second movable lens group passes through the same portion on the compensation cam member several times during a movement of the crank member from one end to the other end of a movable range, i.e., in the case of an optical system such that the second movable lens group reciprocates, the amount of compensation corresponding to the position is read each time from the amount-of-compensation storing device. The compensation cam member driving device is capable of driving the compensation cam member on the basis of the amount of compensation. It is therefore possible to perform positioning with a high accuracy all the time irrespective of the lens position.

In the above lens driving apparatus, according to an additional lens driving apparatus, the compensation cam member driving device drives the compensation cam member to cause a micromovement of the second movable lens group in the optic-axis direction.

According to the above lens driving apparatus, the compensation cam member driving device is capable of driving the compensation cam member so that the second movable lens group makes the micromovement in the optic-axis direction. Hence, it is feasible to perform the lens drive for generating an image signal required during auto-focus control of the lens.

In the above lens driving apparatus, an additional lens driving apparatus according to this invention further comprises a temperature detecting device for detecting a temperature of an environment used. The amount-of-compensation storing device stores an amount of compensation with respect to each temperature. The compensation cam member driving device drives the compensation cam member on the basis of the amount of compensation corresponding to the temperature detected by the temperature detecting device.

According to the above lens driving apparatus, the temperature is measured by the temperature detecting device. The compensation cam member driving device is capable of driving the compensation cam member on the basis of the amount of compensation to give an optimum value at that temperature. Accordingly, it is possible to deal with dimensional variations produced after a final adjustment due to changes in the temperature of the environment used.

It is an object of the present invention to provide a lens driving apparatus capable of increasing the degree of freedom for adjusting a position of a movable lens group through a positional adjustment of a compensation cam member and, at the same time, reducing influences from errors when assembled and from positional errors in a constructive member due to deformation or the like, the influences being exerted on a position of a second movable lens group.

To accomplish the above object, an additional lens driving apparatus according to this invention comprises: first and second movable lens groups; a support element for supporting the first and second movable lens groups so as to be movable in the optic-axis direction through first and second slide members; a first moving device for moving the first movable lens group, a slider crank mechanism being constructed of the first slide member and a crank member linked via a first link member to the first slide member; a driving device for rotationally driving the crank member; a second moving device for moving the second movable lens group to an approximate position, a slider crank mechanism being constructed of the second slide member and the crank member linked via a second link member to the second slide member; and a compensating device for compensating a moving position of the second movable lens group to a normal position by causing a compensation lever member linked to the second link member to be driven by a compensation cam member having a cam curve assuming a predetermined configuration. The cam curve of the compensation cam member is perpendicular to a trajectory plane of the compensation lever member, parallel to a moving axis of the second movable lens group and disposed substantially in a plane including a connecting position of the compensation lever member to the second movable lens group.

According to the lens driving apparatus, during the assembly adjustment, the position of the compensation cam member is adjusted. It is thereby possible to increase the degree of freedom of adjusting for a deviation quantity of optical performance due to the manufacturing error of the lens barrel constructive members such as lens members and mechanism members.

Even when an error is produced in the support element for a guide shaft for moving the second movable lens group along the optic-axis in the direction perpendicular to this support element due to an undulation and deformation, it is also possible to reduce the influence on the positional error of the second movable lens group because of the former error.

It is an object of this invention to provide a lens driving apparatus capable of decreasing a positional deviation of the movable lens group even if the guide shaft in the support element and the link member of the moving device are deformed.

To accomplish the above object, an additional lens driving apparatus according to the present invention comprises: first and second movable lens groups; a support element for supporting the first and second movable lens groups so as to be movable in the optic-axis direction through first and second slide members; a first moving device for moving the first movable lens group, a slider crank mechanism being constructed of the first slide member and a crank member linked via a first link member to the first slide member; a driving device for rotationally driving the crank member; a second moving device for moving the second movable lens group to an approximate position, a slider crank mechanism being constructed of the second slide member and the crank member linked via a second link member to the second slide member; and a compensating device for compensating a moving position of the second movable lens group to a normal position by causing a compensation lever member linked to the second link member to be driven by the compensation cam member having a cam curve assuming a predetermined configuration. The link member of the first moving device and/or the link member of the second moving device is constructed so that an angle made by lines of connecting respective fulcrums becomes a substantially small angle from a parallel state in the moving direction of the first or second movable lens group with respect to the support element in an entire or some area within each driving range.

According to the above lens driving apparatus, even when errors are produced in the support elements for guide shafts for moving the first and second movable lens groups along the optic-axis in the direction perpendicular to the support elements due to undulations and deformations, it is also possible to reduce the influences on the positional errors of the first and second movable lens groups because of the former errors.

It is an object of this invention to provide a lens driving apparatus having a compensation cam plate formed with a cam groove, which plate is capable of being readily adjusted to affect the position of the movable lens group during a compensation of shifting of focus.

To accomplish the above object, an additional lens driving apparatus according to this invention comprises: first and second movable lens groups; a support element for supporting the first and second movable lens groups so as to be movable in the optic-axis direction through first and second slide members; a first moving device for moving the first movable lens group, a slider crank mechanism being constructed of the first slide member and a crank member linked via a first link member to the first slide member; a driving device for rotationally driving the crank member; a second moving device for moving the second movable lens group to an approximate position, a slider crank mechanism being constructed of the second slide member and the crank member linked via a second link member to the second slide member; and a compensating device for compensating a moving position of the second movable lens group to a normal position by causing a compensation lever member linked to the second link member to be driven by the compensation cam member having a cam curve assuming a predetermined configuration. A cam configuration of the cam groove of the compensation cam member is a substantially S-shape.

According to the above lens driving apparatus, the cam configuration of the cam groove of the compensation cam plate is the substantially S-shape. The compensation of only a mid-area of a variable-power range can be therefore easily performed by adjusting the position of the compensation cam plate. What is facilitated is an adjustment of a relative position of the movable lens group due to the manufacturing error during the variable power in the lens system.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Preferred embodiments of the present invention will hereinafter be described in detail with reference to the drawings.

Figure 1:
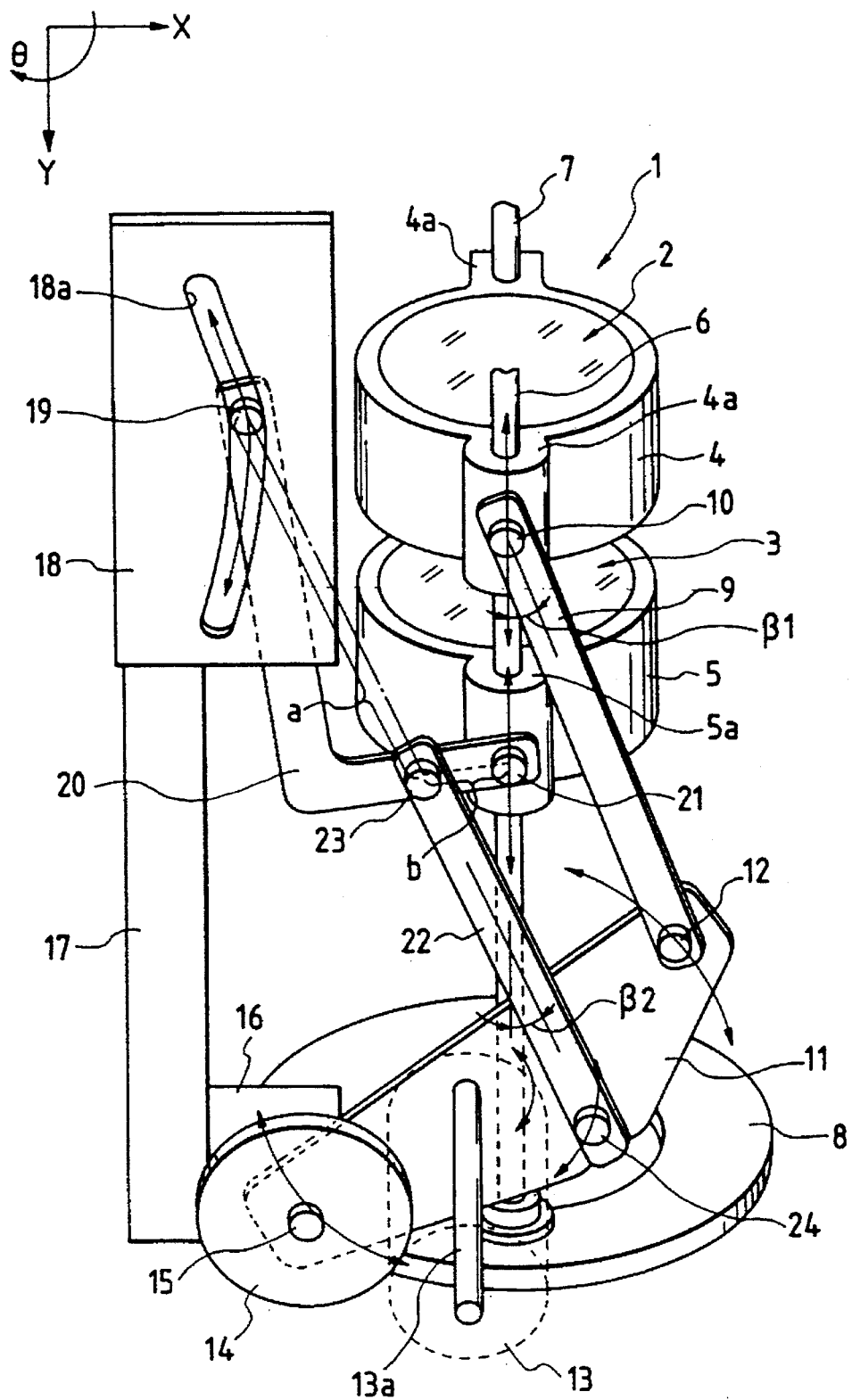
FIG. 1 is a diagram illustrating a first embodiment of a lens driving apparatus of this invention.

FIG. 1 illustrates a first embodiment of a lens driving apparatus according to this invention. The numeral 1 designates a unit of some elements of an optical system in which first and second movable lens groups 2, 3 move on the optic axis in a predetermined relationship, whereby functions of variable power or focusing, etc. come to work.

Note that the lens driving apparatus in this embodiment is constructed to make a moving velocity of the first movable lens group 2 higher than a moving velocity of the second movable lens group 3. Further, a moving stroke of the first movable lens group 2 is set longer than a moving stroke of the second movable lens group 3. A tolerance of positional error of the first movable lens group 2 is set smaller than a tolerance of positional error of the second movable lens group 3.

Cylindrical lens barrels 4, 5 accommodate the first and second movable lens groups 2, 3.

Lens barrel support members 4a, 5a are formed on both sides of the lens barrels 4, 5. Guide shafts 6, 7 are inserted through these lens barrel support members 4a, 5a in parallel in the optic axis direction. The lens barrels 4, 5 are so supported on the guide shafts 6, 7 as to be movable in the optic axis direction with the aid of the lens barrel support members 4a, 5a.

One end of the guide shafts 6, 7 are each fixed to a ring-like support plate 8.

One end of a link member 9 is rotatably connected via a connecting member 10 to one lens barrel support member 4a of the first movable lens group 2.

The other end of the link member 9 is rotatably connected via a connecting member 12 to one end of a driving crank 11.

Accordingly, in this embodiment, the driving crank 11, the link member 9 and the guide shaft 6 are combined to constitute a slider crank mechanism.

A motor shaft 13a of a driving motor 13 consisting of a stepping motor is fixed directly to the driving crank 11. The driving crank 11 rotates with rotations of the motor shaft 13a.

Note that the driving motor 13 is drive-controlled under open-loop control in this embodiment. The motor shaft 13a rotates, whereby the lens barrel support member 4a slides on the guide shaft 6 through the driving crank 11 as well as through the link member 9. The first movable lens group 2 thereby moves in the optic axis direction.

A balancer 14 is so disposed at the end of the driving crank 11 on the opposite side to the link member 9 as to be rotatable through a connecting member 15.

In this embodiment, a compensation cam fixing member 17 is fixed via a bracket 16 to the support plate 8.

A compensation cam plate 18 is detachably fixed to the upper part of the compensation cam fixing member 17.

The compensation cam plate 18 is cut with a cam groove 18a.

A cam follower 19 is fitted in this cam groove 18a.

The cam follower 19 is rotatably fixed to one end of a compensation lever 20.

The other end of the L-shaped compensation lever 20 is so connected via a connecting member 21 to the lens barrel support member 5a of the second movable lens group 3 as to be rotatable through a connecting member 21.

One end of the link member 22 is so connected to the connecting member 21 of the compensation lever 20 as to be rotatable through a connecting member 23.

The other end of the link member 22 is so connected to the driving crank 11 as to be rotatable through a connecting member 24. Hence, in the second movable lens group 3 also, a slider crank mechanism is constructed of the driving crank 11, the link member 22, the lens barrel support member 5a and the guide shaft 6.

Figure 2:
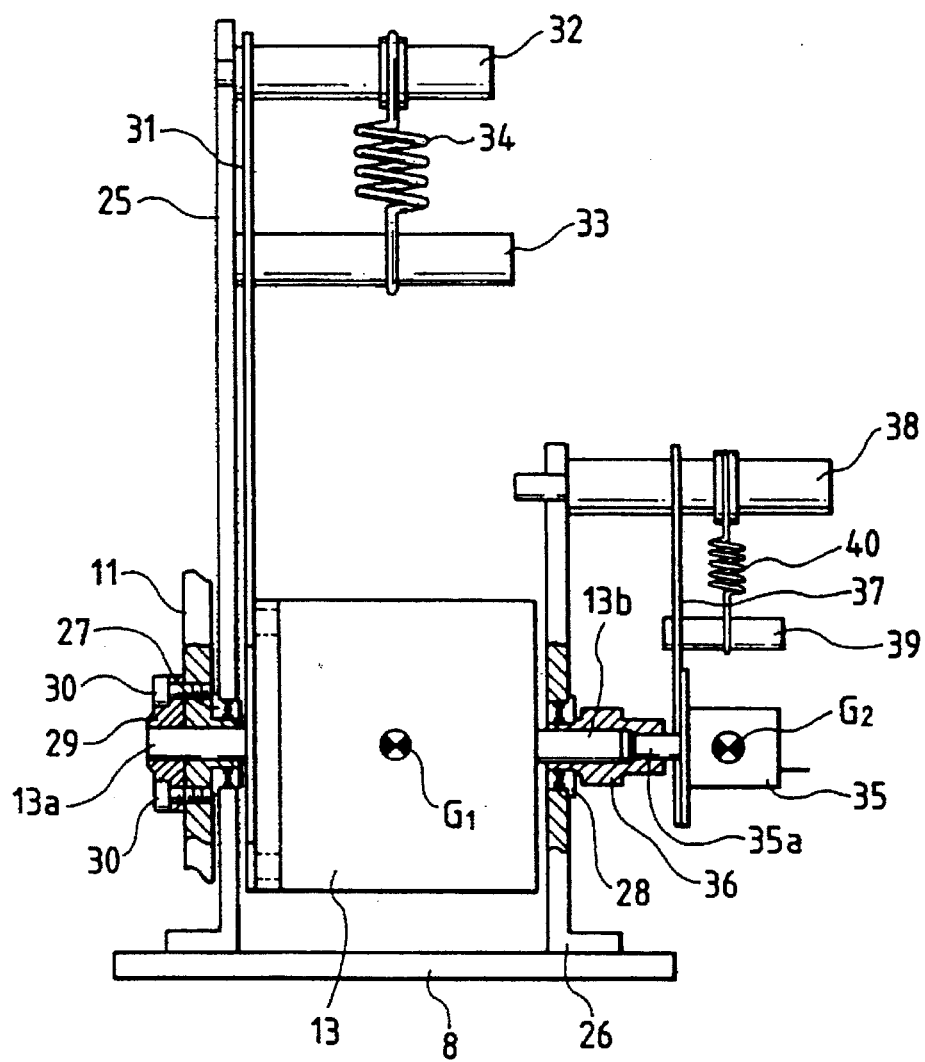
FIG. 2 is a side view showing a support mechanism of a motor for rotating a driving crank.

FIG. 2 fully shows a support mechanism of the driving motor 133 described above. The numeral 11 represents the above driving crank.

The driving motor 13 is disposed between driving motor support members 25, 26 disposed in parallel at a predetermined spacing. These driving motor support members 25, 26 are fixed to the support plate 8.

Motor shafts 13a, 13b are protruded from both sides of the driving motor 13. These motor shafts 13a, 13b are supported on driving motor support members 25, 26 through bearings 27, 28.

The motor shaft 13a on one side is inserted through the driving crank 11. A connecting member 29 fixed to the top end of the motor shaft 13a is fixed to the driving crank 11 with a bolt 30.

One end of a driving motor rotation stopper plate 31 is fixed to one side of the driving motor 13.

Figure 3:
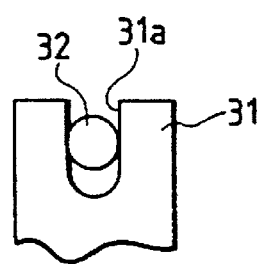
FIG. 3 is an explanatory view showing a top end of a motor rotation stopper plate.

The other end of this driving motor rotation stopper plate 31 is, as depicted in FIG. 3, formed with an U-shaped notch 31a.

A driving motor rotation stopper bar 32 having its one end fixed to the driving motor support member 25 is inserted in this notch 31a.

One end of a driving motor support bar 33 is fixed to the driving motor rotation stopper plate 31. This driving motor support bar 33 is supported on the driving motor rotation stopper bar 32 through a tensile spring 34.

Note that a position of the tensile spring 34 is set a position upwardly perpendicular to a gravity position $G_1$ including a non-rotational part of the driving motor 13, the driving motor rotation stopper plate 31 and the driving motor support bar 33.

Further, a spring force of the tensile spring 34 is set so that a load on the bearing part within the driving motor 13 is minimized in a suspension state of the driving motor 13.

A potentiometer 35 for detecting a rotary angle of the motor shaft 13b is disposed on the other side of the driving motor 13.

A rotary shaft 35a of the potentiometer 35 is connected via a connecting member 36 to the motor shaft 13b.

The potentiometer 35 is fixed to a potentiometer rotation stopper plate 37.

The potentiometer rotation stopper plate 37 is formed with an unillustrated U-shaped notch as in the same way with the driving motor rotation stopper plate 31.

Inserted in this notch is a potentiometer rotation stopper bar 38 having its one end fixed to the driving motor support member 26.

One end of a potentiometer support bar 39 is fixed to the potentiometer rotation stopper plate 37. This potentiometer support bar 39 is supported on the potentiometer rotation stopper bar 38 through a tensile spring 40.

Note that a position of the tensile spring 40 is set in a position upwardly perpendicular to a gravity position $G_2$ including a non-rotational part of the potentiometer 35, the potentiometer rotation stopper plate 37 and the potentiometer support bar 39.

Figure 4:
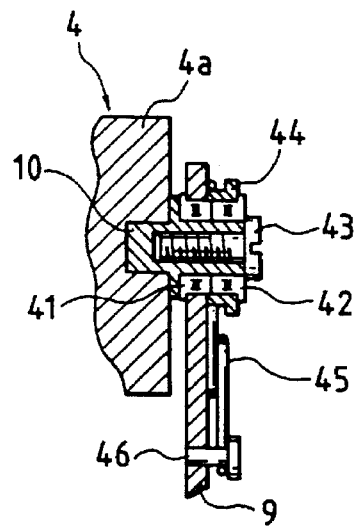
FIG. 4 is a sectional view illustrating a connection part of a link member to a lens barrel.
Figure 5:
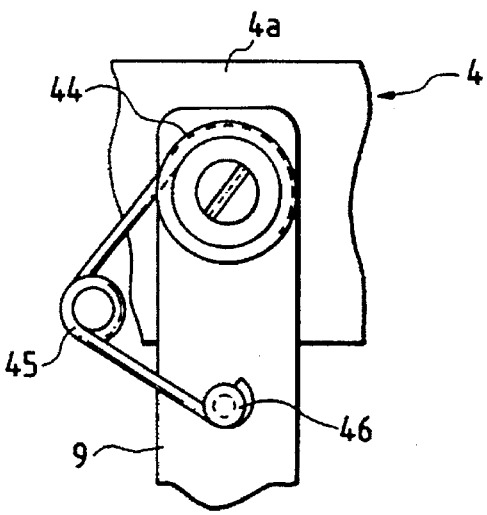
FIG. 5 is a frontal view of FIG. 4.

FIGS. 4 and 5 illustrate a connecting part of the link member 9 to the lens barrel support member 4a of the lens barrel 4. The link member 9 is fixed via a bearing 41 to the lens barrel support member 4a with the connecting member 10.

A bearing 42 adjacent to the bearing 41 is fitted to the connecting member 10. A screw 43 serves to prevent the bearing 42 from coming off.

A sleeve 44 is fitted to the bearing 42. One end of a torsion spring 45 is secured to the sleeve 44.

The other end of the torsion spring 45 is secured to a pin member 46 fixed to the link member 9. The torsion spring 45 always biases the connecting member 10 toward the pin member 46.

Figure 6:
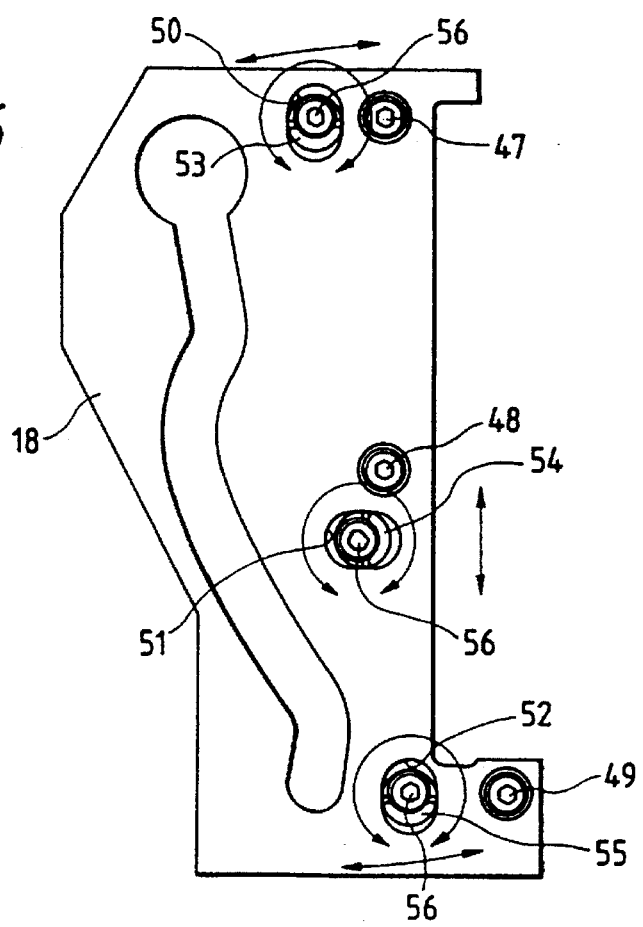
FIG. 6 is a frontal view depicting a structure for fitting a compensation cam plate to a compensation cam fixing member.

FIG. 6 shows details of a structure of fitting the compensation cam plate 18 to the compensation cam fixing member 17. The compensation cam plate 18 is adjustably fixed to the compensation cam fixing member 17.

More specifically, the compensation cam plate 18 is fixed to the compensation cam fixing member 17 by use of three pieces of bolts 47, 48, 49 inserted into the upper, middle and lower parts of the compensation cam plate 18.

Then, the compensation cam plate 18 includes adjustment elongate holes 50, 51, 52 respectively formed in the vicinities of the bolts 47, 48, 49.

The adjustment elongate holes 50, 52 are formed in the up-and-down directions of the compensation cam plate 18, while the adjustment elongate hole 51 is formed to extend in the right-and-left directions.

Inserted into the adjustment elongate holes 50, 51, 52 are eccentric cams 53, 54, 55 in which the center of a major diameter is different from the position of the rotary shaft. These eccentric cams 53, 54, 55 are each fixed to the compensation cam fixing member 17 with bolts 56.

Therefore, when rotating the eccentric cam 56, the compensation cam plate 18 rotates substantially about the eccentric cam 55.

Further, when rotating the eccentric cam 55, the compensation cam plate 18 rotates substantially about the eccentric cam 53.

Moreover, when rotating the eccentric cam 54, the compensation cam plate 18 moves up and down.

In the above lens driving apparatus, a motion of the second movable lens group 3 is regulated by the guide shaft 6 in the optic axis direction. On the other hand, the compensation cam 18 is also fixed to the compensation cam fixing member 17, and, therefore, the motion of the compensation lever 20 is regulated. A position of the compensation lever 20 is determined, thereby determining a position of the second movable lens group 3.

That is, the driving crank 11 rotates, thereby determining a position of the connecting member 24 defined as one fulcrum of the link member 22. On the other hand, the compensation lever 20 and the link member 22 are linked via the connecting member 23. A position of the compensation lever 20 is therefore determined, and a position of the second movable lens group 3 is also determined.

Namely, in this mechanism, the link member 22 serves to perform approximate positioning of the second movable lens group 3 with respect to a precise setting position. On the other hand, the compensation lever 20 serves to set a movement quantity for compensation by use of the compensation cam plate 18.

Then, a displacement quantity of the second movable lens group 3 in the optic axis direction that is compensated by this compensation cam plate 18 does not become an actual displacement quantity of the cam follower 19 through the cam groove 18a of the compensation cam plate 18. The displacement approximates to a ratio b/a of a distance a between the cam follower 19 and the connecting member 23 to a distance b between the connecting member 23 and the connecting member 21. A scale-up and a scale-down are possible on the basis of the principle of lever.

In accordance with this embodiment, the distance a is approximately five times as large as the distance b. The displacement quantity of the cam follower 19 on the compensation cam plate 18 is reduced by a factor of about 5. The position of the second movable lens group 3 is compensated.

In the thus constructed lens driving apparatus, however, when rotating the driving motor 13, the driving crank 11 is rotated. The lens barrel 4 moves along the guide shaft 6 with aid of the link member 9. The first movable lens group 2 in the lens barrel 4 is moved along the optic axis direction. Simultaneously, the compensation lever 20 is moved by the link member 22. The second movable lens group 3 is thereby moved in the predetermined relationship with the first movable lens group 2. Hence, the first and second movable lens groups 2, 3 can be moved quickly and surely with a high accuracy in the predetermined relationship.

That is, the second movable lens group 3 is transferred in an approximate manner by the slider crank mechanism. On the other hand, positioning the second movable lens group 3 is performed by use of the compensation cam plate 18. It is therefore possible to surely move the second movable lens group 3 with high accuracy.

Further, the cam is formed on a part of the movable member such as driving crank 11 or the link member 22, and instead, the compensation cam plate 18 formed with the cam groove 18a is fixed. Hence, there are advantages in which a change in the relationship between the related members is facilitated, and the cam is easy to change at the manufacturing stage.

Further, the compensation cam plate 18 is externally detachable from the compensation cam fixing member 17. Consequently maintenance is facilitated and the positional compensation of the second movable lens group 3 through the compensation cam plate 18 is also facilitated.

Additionally, the position of the compensation cam plate 18 is adjustable, and, hence, it is possible to easily change or compensate the relationship with other movable lens groups and the position of the self-group.

Besides, a distance between the point of force and the fulcrum is set larger than a distance between the point of action and the fulcrum by utilizing the principle of lever. According to the principle of lever, the fulcrum is one end of the link member 22, the point of force is the cam follower 19 through which the compensation lever 20 engages with the compensation cam plate 18, and the point of action is the part through which the compensation lever 20 is connected to the second movable lens group 3. Accordingly, a working accuracy of the cam groove 18a can be relaxed several times with respect to an allowable accuracy of the position of the second movable lens group 3.

As a result, it is feasible to minimize an influence of disturbance due to dust in the cam groove 18a on the second movable lens group 3. Influences from an abrasion and deformation of the cam surface can be also minimized.

Besides, the principle of lever is utilized, and therefore a drive load on the cam groove 18a is reduced by a factor of 4 to 6. Durabilities of the cam groove 18a and of the cam follower 19 can be thereby enhanced.

Furthermore, in accordance with this embodiment, the allowable quantity of the positional error of the first movable lens group 2 is set smaller than the allowable quantity of the positional error of the second movable lens group 3. It is therefore possible to readily satisfy a required range of the positional error.

Additionally, in this embodiment, the moving velocity or stroke of the first movable lens group 2 is higher or longer than the moving velocity or stroke of the second movable lens group 3, thereby enhancing the moving accuracy.

Besides, in this embodiment, the balancer 14 is disposed on the driving crank 11. This therefore requires a quite small amount of torque of the driving source when keeping the movable lens groups 2, 3 in specific positions.

Further, in accordance with this embodiment, the slider crank mechanisms are employed, and hence, even when, e.g., driving crank makes one or more rotations, the moving range of the movable lens groups 2, 3 are limited to a certain range. This eliminates a necessity for safety stopper mechanisms at both ends of the moving range. The costs can be reduced. Moreover, if the positions of the movable lens groups 2, 3 are required to be reset, the positions can be easily detected by using the both ends.

Further, in the lens driving apparatus described above, the power transmission can be performed by the rotary mechanism involving the use of the bearings while eliminating all of the slide elements. A transmission efficiency is improved, while the driving source can be downsized. The transmitting mechanism can be also downsized.

Additionally, no slide mechanism is provided, and hence the durability increases. The high accuracy can be surely maintained.

Furthermore, the element for removing a backlash of the connecting part of each constructive member is directed to apply a substantially internal force. The influences exerted on other components and a loss of driving can be reduced enough.

Further, the motor shaft 13a of the driving motor 13 is fixed directly to the driving crank 11. Accordingly, there is eliminated the necessity for the connecting member for connecting the motor shaft 13a to the driving crank 11. The mechanism for keeping the shaft accuracy through the connection becomes unnecessary. The mechanism is thus simplified. Then, there is caused no unnecessary loss of the driving force due to the connection. Further, the costs for the parts can be also decreased.

Further, the torsion spring 45 is disposed to restrain the backlash produced in the connecting part of the link member to the lens barrel support member 4a. Consequently, there is no positional deviation due to the backlash or no flaw due to an impingement between the members in the backlash. The lens driving apparatus exhibiting the high accuracy and high durability can be readily actualized.

Further, in this embodiment, the driving motor 13 is constructed of the stepping motor which is open-loop-controlled, whereby the driving motor 13 can be easily quickly controlled.

Additionally, in this embodiment, the rotation of the driving motor 13 is detected by the potentiometer 35. A step-out of the driving motor 13 can be therefore certainly detected.

Furthermore, in accordance with this embodiment, the engaged portion between the driving motor rotation stopper plate 31 and the driving motor rotation stopper bar 32 is located as apart from the driving motor 13 as possible. Hence, it is feasible to decrease a thrust of the engaged portion due to the torque caused when the driving motor 13 rotates and stops. A strength of the engaged portion can be decreased. It is also possible to enhance the durability because of the reductions both in deformation and in abrasion.

Incidentally, in the embodiment discussed above, the gravity works on the second movable lens group 3 when this lens group remains stopped. The cam follower 19 is therefore in contact with the right side surface of the cam groove 18a of the compensation cam plate 18. So far as a fixed or greater acceleration is not applied in the upper perpendicular direction, the cam follower 19 is always in contact with the same cam surface also during a movement of the second movable lens group 3.

If the fixed or greater acceleration is applied to the second movable lens group 3 in the upper perpendicular direction, however, there appears such a phenomenon that the cam follower 19 separates from the right cam surface of the cam groove 18a of the compensation cam plate 18.

In this case, the positional relationship between the first and second movable lens groups 2, 3 disorders on the midway of the movement of the second movable lens group 3. The performance decreases. Besides, the positional disorder is caused also when stopped because of the flaws produced by the impingement in the re-contact between the cam follower 19 and the compensation cam plate 18, and so forth. A decline in the performance and a reduction in the life-time due to the flaws are inevitable.

Then, it is required for preventing the phenomenon described above that a spring or the like gives biasing between the cam follower 19 and the compensation cam plate 18 so that the cam follower 19 does not separate from the cam surface even in a state where the second movable lens group 3 is actually moving at the maximum acceleration.

Note that the embodiment discussed above has dealt with the example where the motor shaft 13a is fixed directly to the driving crank 11. The present invention is not, however, confined to the embodiment given above. As a matter of course, for instance, the driving crank 11 may be driven through the link member or the like.

As discussed above, according to the lens driving apparatus in the first embodiment, the first movable lens group is moved by the first moving device. The second moving device moves the second movable lens group. At the same time, a deviation of the moving quantity of the second movable lens group from the predetermined moving quantity is compensated by the compensation device. Accordingly, an advantage is exhibited, wherein the first and second movable lens groups can be moved quickly certainly with the high accuracy in the predetermined relationship.

Next, a second embodiment will be discussed.

In the lens driving apparatus in accordance with the first embodiment, there exist working errors of the lens members and mechanism members and errors (which will hereinafter be collectively termed manufacturing errors) due to a scatter in the assembling operation, etc.. Hence, for satisfying the optical performance, there arises in some cases a necessity for compensating the positional relationship between the first and second movable lens groups 2, 3 with respect to the whole lens system and the mutual positional relationship between the first and second movable lens groups 2, 3 on the basis of design values.

The above compensation is attained by changing the positional relationship of the second movable lens group 3 with respect to the first movable lens group 2 while adjusting the position of the compensation cam plate 18. It is, however, difficult to ensure the optical performance needed in the whole driving range only by an adjustment of the compensation cam plate 18 in the great majority of cases. A shift adjustment of the first movable lens group 2 in the optical direction is also performed in combination therewith in some cases. The shift adjustment of the first movable lens group 2 involves a positional adjustment of the lens group in the optic axis direction by interposing an adjusting member such as a washer, etc. between the lens frame and the lens group and varying a thickness of this adjusting member. Further, a fitting position of the link member 9 to the first movable lens group 2 is determined but can not be changed by an operation such as an adjustment or the like.

In the lens driving apparatus in accordance with the first embodiment, however, changing the thickness of the adjusting member requires the steps of removing, replacing or working, after demounting the lens frame and the lens group, the adjusting member and thus obtaining a desired thickness. Thereafter, an assembling operation is also carried out. This is conducive to poor reproducibility, requires a good number steps of the adjusting operation and is time-consuming in operation. This further leads to an increase in the costs.

Moreover, after the assembly adjustment, it follows that the position of each member is determined. Dimensional variations derived from changes in temperature in the environment used are hard to deal with after the final adjustment.

The second embodiment will hereinafter be discussed in greater detail with reference to the drawings.

Figure 7:
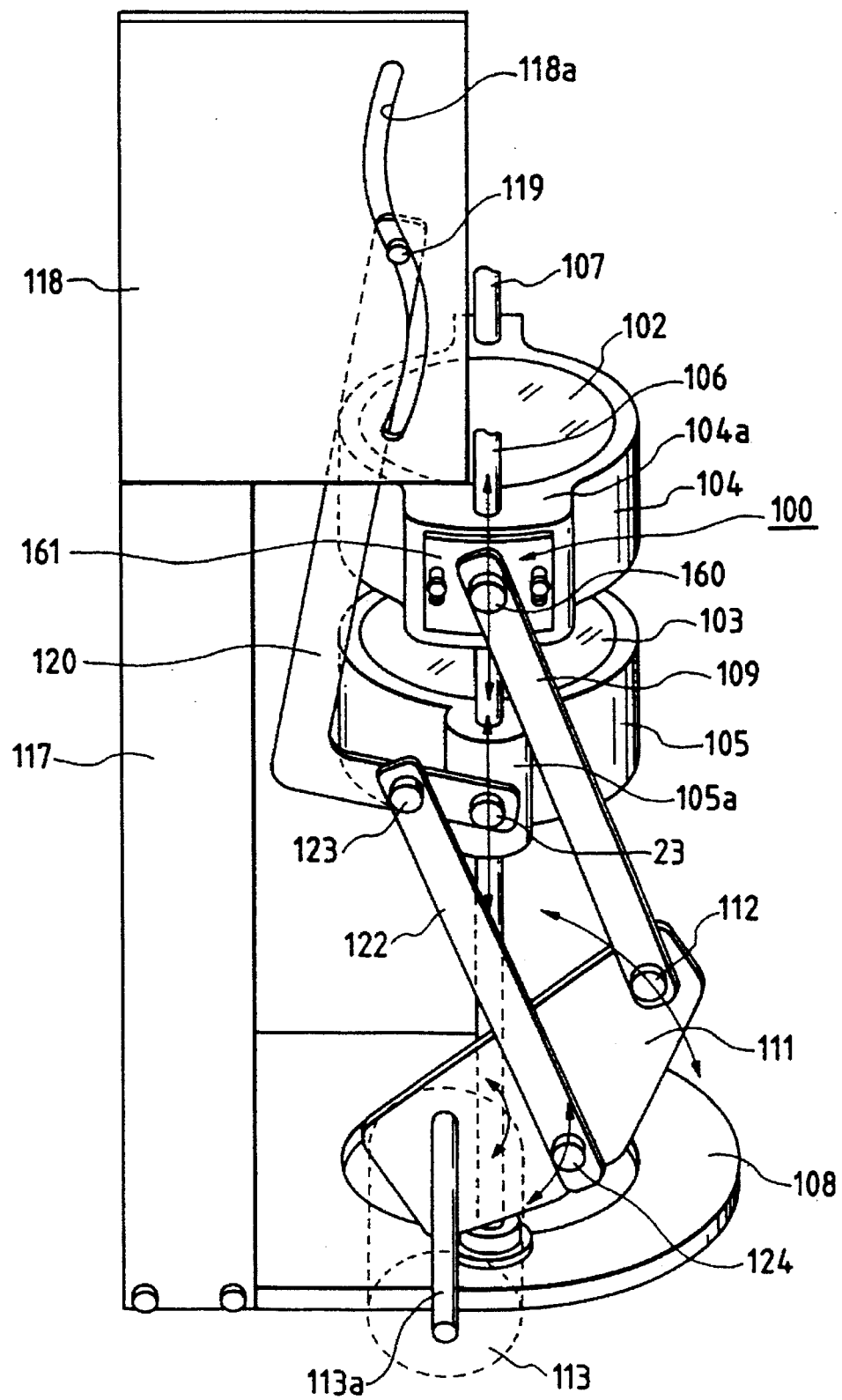
FIG. 7 is a diagram view showing a second embodiment of the lens driving apparatus of this invention.
Figure 8:
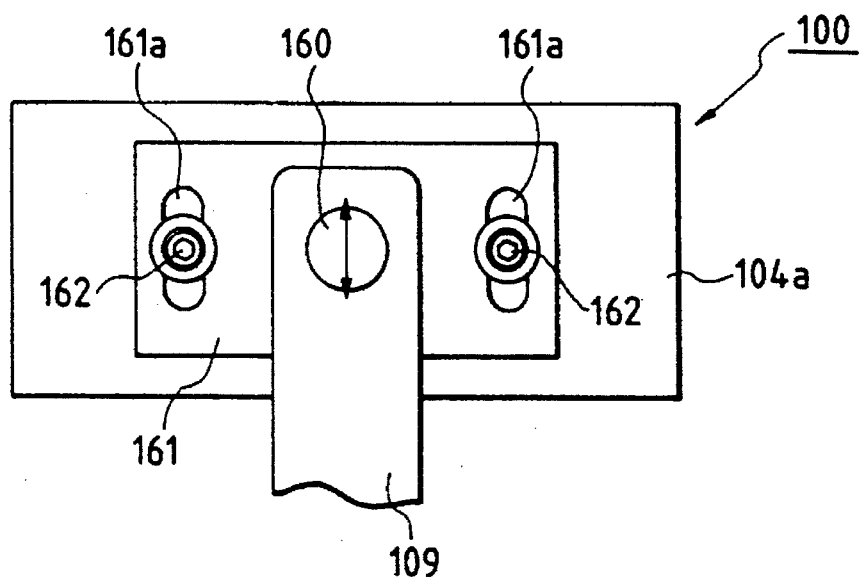
FIG. 8 is a frontal view illustrating a position adjusting device of the link member.

FIG. 7 is a diagram illustrating the second embodiment of the lens driving apparatus according to this invention. FIG. 8 is a frontal view showing a position adjusting device in accordance with the second embodiment. Note that elements performing the same functions as those of the basic construction are marked with the like numerals plus 100, and the repetitive explanations will be omitted.

In a connecting unit 100 in the second embodiment, a link member 109 is rotatably fitted to an auxiliary fitting plate 161 through a connecting member 160. The auxiliary fitting plate 161 is formed with two elongate holes 161a. Fitting bolts 162 are attached via the elongate holes 161a to the first movable lens group 102.

An on-the-optical-axis position of the auxiliary fitting plate 161 to the first movable lens group 102 is adjustable within a range of the elongate hole 161a by loosening the fitting bolts 162. After finishing the adjustment, the auxiliary fitting plate 161 is fixed to the first movable lens group 102 by fastening the fitting bolts 162.

Further, the positional adjustment can be also done by taking the same construction when attaching a compensation lever 120 to the second movable lens group 103 or a link member 122.

Note that fitting between the first movable lens group 102 and the link member 109 or between the compensation lever 120 and the second movable lens group 103 or the link member 122 is not limited to the construction of this embodiment if the position is adjustable but fixable when used. Further, a mechanism capable of making a micro-adjustment may be taken for the positional adjustment, thereby facilitating the adjusting operation.

Figure 9:
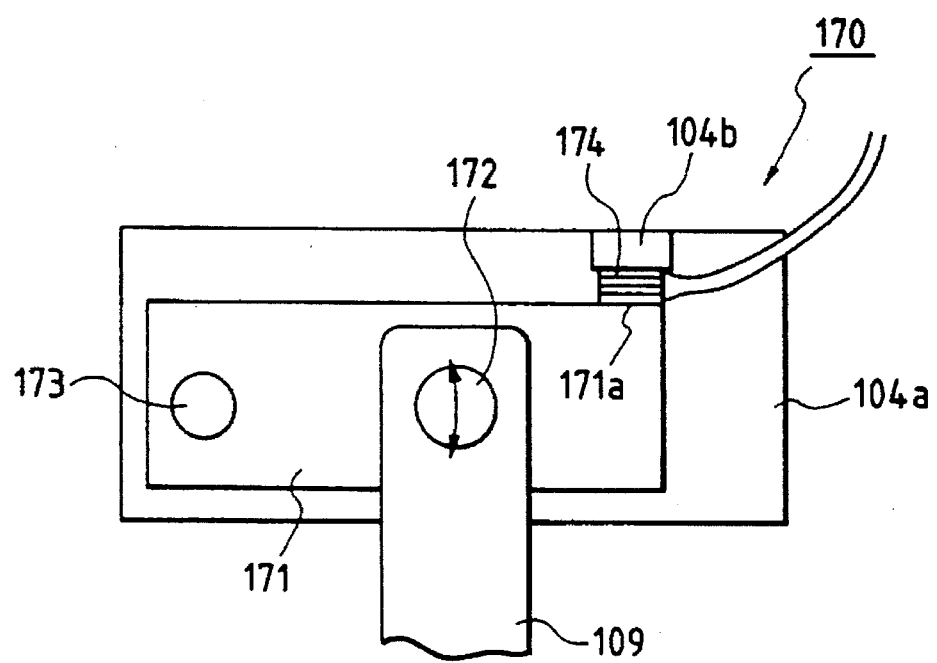
FIG. 9 is a diagram showing the position adjusting device in a third embodiment of the lens driving apparatus of this invention.

FIG. 9 is a view illustrating details of the position adjusting device of the lens driving apparatus in a third embodiment of this invention. Note that the whole construction other than the connecting unit is the same as that in FIG. 7, and, therefore, its illustration is omitted. An explanation will be given, wherein the elements performing the same functions are marked with the like numerals.

In a connection member 170 in the third embodiment, a link member 109 is so fitted through a connecting member 172 to an auxiliary fitting plate 171 as to be rotatable about the connecting member 172. The auxiliary fitting plate 171 is attached through a connecting member 173 to a lens barrel support member 104a of the first movable lens group 102 so that the plate 171 is rotatable about the connecting member 173.

Further, a piezoelectric element 174 is joined between an end part 171a of the auxiliary fitting plate 171 and a protruded part 104b provided on the lens barrel support member 104a of the first movable lens group 102. A voltage applied to this piezoelectric element 174 is varied, thereby changing an axial length of the link member 109 of the piezoelectric element 174. The auxiliary fitting plate 171 rotates with respect to the first movable lens group 102, thus varying the position of the link member 172 defined as a fulcrum of the link member 109 with respect to the first movable lens group 102.

Figure 10:
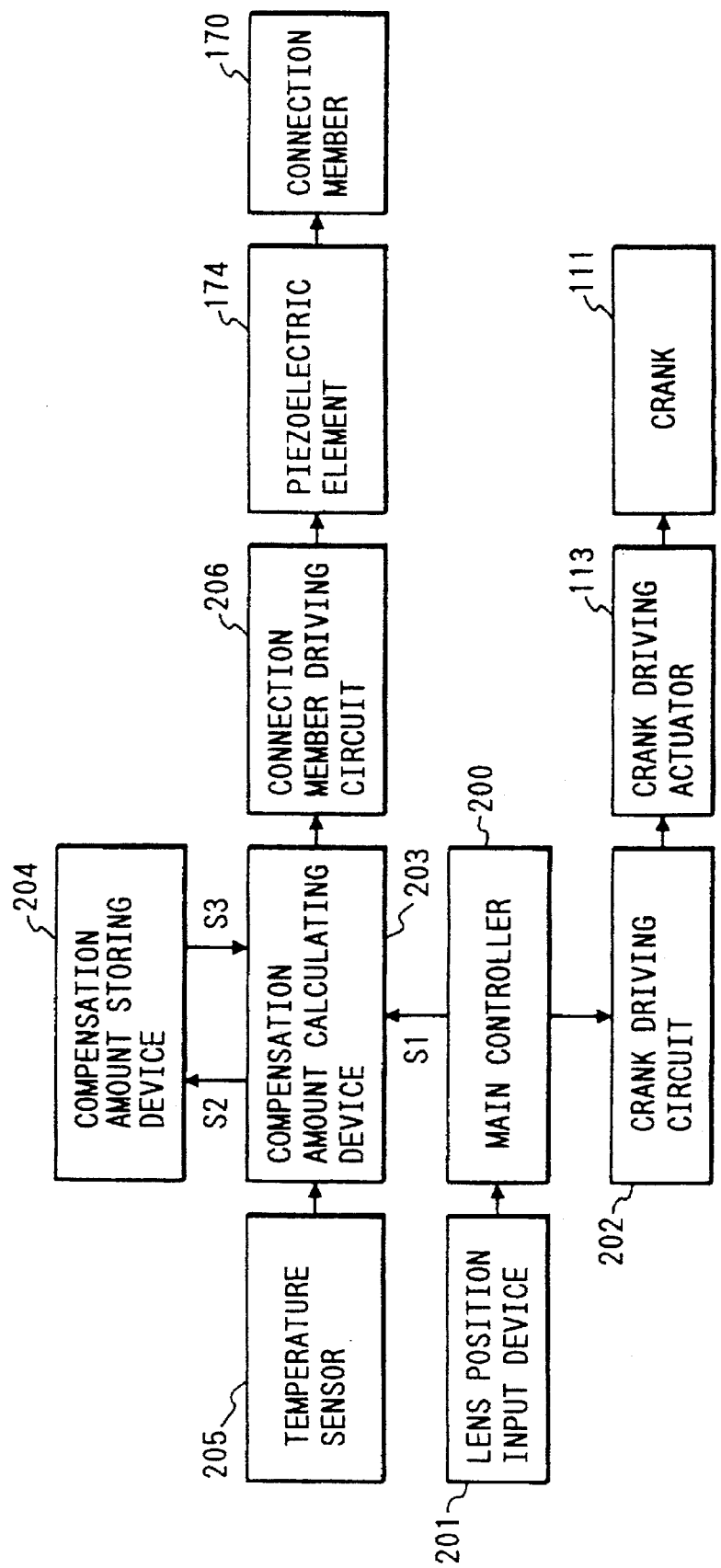
FIG. 10 is a block diagram illustrating the control layout of the lens driving apparatus in the third embodiment.

Next, the operation of the third embodiment will be explained in combination with a control circuit. FIG. 10 is a block diagram showing the control layout of the lens driving apparatus in the third embodiment.

A main controller 200 controls the whole of the lens driving apparatus in this embodiment. A lens position input device 201 inputs a position signal for determining a lens position. An output of this input device 201 is connected to the main controller 200. The main controller 200 transmits a control signal to a crank driving circuit 202 on the basis of the position signal from the lens position input device 201. A driving motor, i.e., a crank driving actuator 113 is thus driven. A crank 111 is thereby rotated to provide a crank angle corresponding to the lens position determined.

Here, the main controller 200, each time the crank 111 rotates through a predetermined angle, generates a signal S1 of crank position information at that time and outputs it to an amount-of-compensation calculating device 203. The amount-of-compensation calculating device 203 calculates an amount of compensation of the connection member 170 on the basis of signals transmitted from the main controller 200, an amount-of-compensation storing device 204 and a temperature sensor 205.

The amount-of-compensation storing device 204 stores amount-of-compensation data of the connection member 170 per temperature and position of the first movable lens group 102, the data being needed for compensation the manufacturing errors. The amount-of-compensation data are obtained by measuring a deviation quantity of the optical performance in an after-the-assembly-adjustment state of the lens barrel at every temperature and in every position of the first movable lens group 102, obtaining an amount of compensation of the second movable lens group 103 in the optic axis direction that is required for compensating the deviation quantity and converting the amount of compensation into a driving quantity of the connection member 170 for performing the compensation in the optic axis direction.

The amount-of-compensation calculating device 203 reads the amount of compensation of the corresponding connection member 170 from the amount-of-compensation storing device 204. This reading process is done based on the signal S1 of the crank position information inputted from the main controller 200 and the temperature information given from the temperature sensor 205.

The amount-of-compensation calculating device 203 obtains the driving quantity of the connection member 170 on the basis of a signal 3 of the amount-of-compensation data read therefrom. The amount-of-compensation calculating device 203 transmits a driving signal to a connection member driving circuit 206, and the piezoelectric element 174 is driven, thereby determining a position of the connection member 170.

Incidentally, the explanation has been given by exemplifying the driving of the first movable lens group 102, the link member 109 and the connection member 170 in FIG. 10. However, the connection member of the compensation lever 120 to the first movable lens group 102 or the link member 122 can be also driven with the same construction.

The construction is not confined to the embodiment discussed above but is modifiable and changeable in a variety of forms. Those are included in this invention.

For example, the explanation has been given by exemplifying the laminated type piezoelectric element as an actuator for driving the connection member 170. This may be replaced with an actuator involving the use of a servo mechanism which employs a motor.

Note that there may be made the positional adjustment of both or any one of the connection member between the first movable lens group 102 and the link member 109 and the connection member between the compensation lever 120 and the second movable lens group 103 or the link member 122.

As discussed above, according to the second embodiment, the position of the connection member for fitting the movable lens group and the link member is adjustable. Obtained accordingly is such an effect that the movable lens group can be adjusted in the optic axis direction only by adjusting the fitting position.

Further, the position of each lens group can be shifted by adjusting the position of the connection member. It is therefore possible to compensate manufacturing errors with respect to the design value of the lens member. A desired value of the optical performance can be attained.

Stored at every necessary interval according to the third embodiment is the amount of compensation of the connection member's position that is needed for determining the position of the second movable lens group with respect to the position of the first movable lens group. The position adjusting device is driven in accordance with the amount of compensation. Accordingly, there is obtained an effect in which the highly accurate positioning can be performed all the time irrespective of the lens position.

The third embodiment exhibits the following effect. The position of the connection member is adjustable even after the assembly adjustment. It is therefore feasible to deal with the dimensional variations derived from the changes in terms of temperature in the environment used that are caused after the final adjustment. This is done by measuring the temperature through the temperature detecting device and calculating the amount of compensation to provide an optimum value at that temperature.

Next, a fourth embodiment will be explained.

In the lens driving apparatus in the first embodiment, the lengths between the fulcrums of the respective members such as the link members 9, 22 and the compensation lever 20 constituting the slider crank mechanism are determined when working and assembling the respective members. The adjustment after the assembly is impossible.

In the lens driving apparatus in the first embodiment, the distance between the connecting points of the respective members is different from the design value because of the several members. Produced is a deviation between the design value and the actual positions of the movable lens groups 2, 3 with respect to a rotary angle of the crank 11. For this reason, there arises a problem wherein the optical performance declines.

It is also thinkable to reduce the positional deviations of the movable lens groups 2, 3 that are caused due to manufacturing errors. It is, however, difficult to make the compensation over the entire movable range with the high accuracy only by the positional adjustment of the compensation cam plate 18.

Further, the position of each member is determined after the assembly adjustment. Hence, the dimensional variations derived from the changes in the temperature of the environment employed are hard to deal with after the final adjustment.

The fourth embodiment will hereinafter be explained in greater detail with reference to the drawings.

Figure 11:
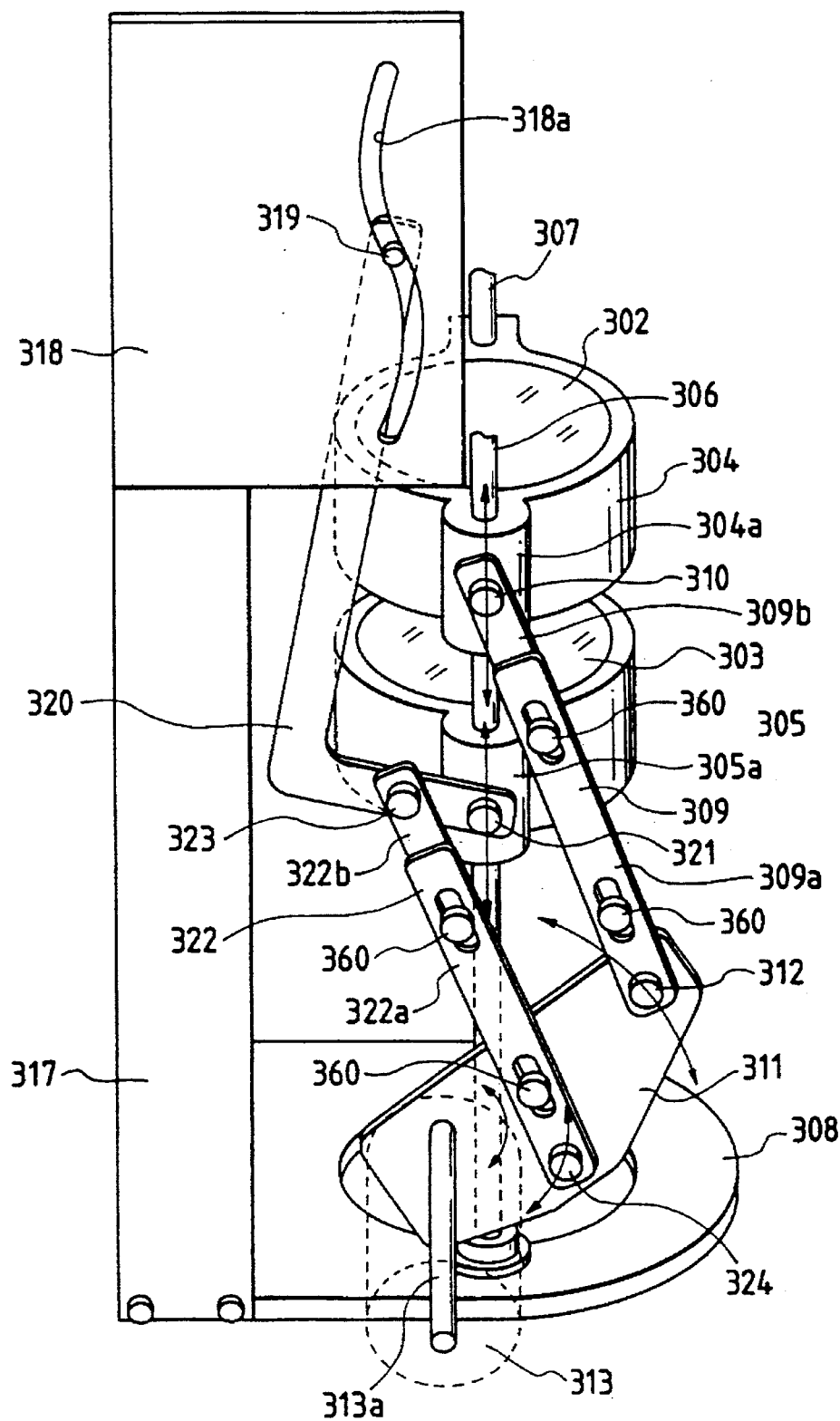
FIG. 11 is a diagram showing a fourth embodiment of the lens driving apparatus of this invention.

FIG. 11 is a diagram illustrating the fourth embodiment of the lens driving apparatus according to this invention. Note that the elements performing the same functions as those of the basic construction shown in FIG. 1 are marked with the like numerals plus 300, and repetitive explanations will be omitted.

In the fourth embodiment, a link member 309 is constructed of two members such as a main link member 309a and an adjustment link member 309b. A fulcrum-to-fulcrum length of the link member 309 can be varied by adjusting a connected state of the main link member 309a and the adjustment link member 309b.

Similarly, a link member 322 is composed of two members such as a main link member 322a and an adjustment link member 322b. A fulcrum-to-fulcrum length is adjustable.

Figure 12A:
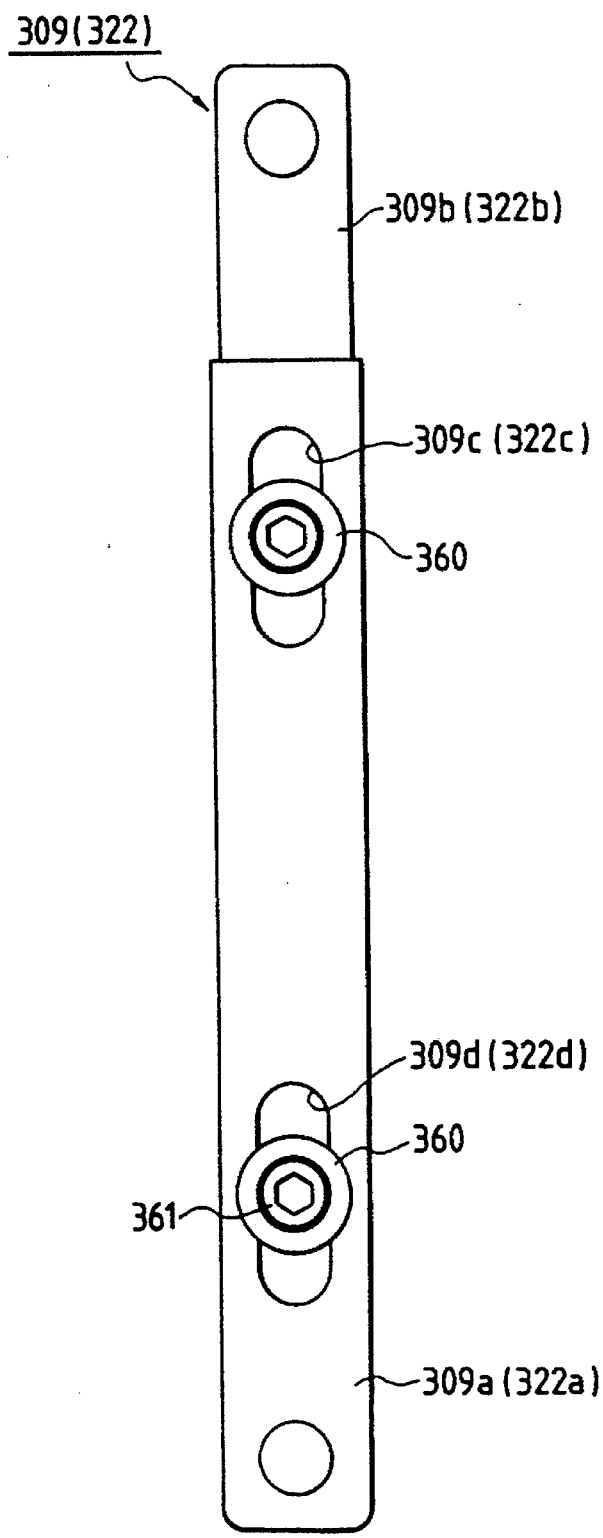
FIG. 12A is a frontal view illustrating a length adjusting device of the link member.

FIG. 12A is a frontal view showing a length adjusting device for the link member of FIG. 11.

Figure 12B:
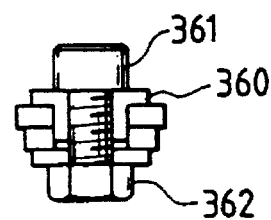
FIG. 12B is a sectional view of a fitting bolt.

The main link member 309a and the adjustment link member 309b are, as illustrated in FIG. 12B, screw-fixed at two portions with fitting bolts 361 and nuts 362 through sleeves 360. The main link member 309a is formed with elongate holes 309c, 309d in which the sleeves are fitted. When fastening the fitting bolts 361 and the nuts 362, a length of the link member 309 is variable within a range of the elongate holes 309c, 309d. The fitting bolts are fastened after the adjustment has been ended. The fulcrum-to-fulcrum length of the link member 309 is fixed.

Further, the link member 322 also takes the same construction, and the fulcrum-to-fulcrum length is adjustable.

Note that the link members 309, 322 are not limited to the construction of this embodiment if the lengths thereof are adjustable but fixable when used. Besides, a mechanism capable of the micro-adjustment may be taken for adjusting the lengths, whereby the adjusting operation can be facilitated.

Figure 13A:
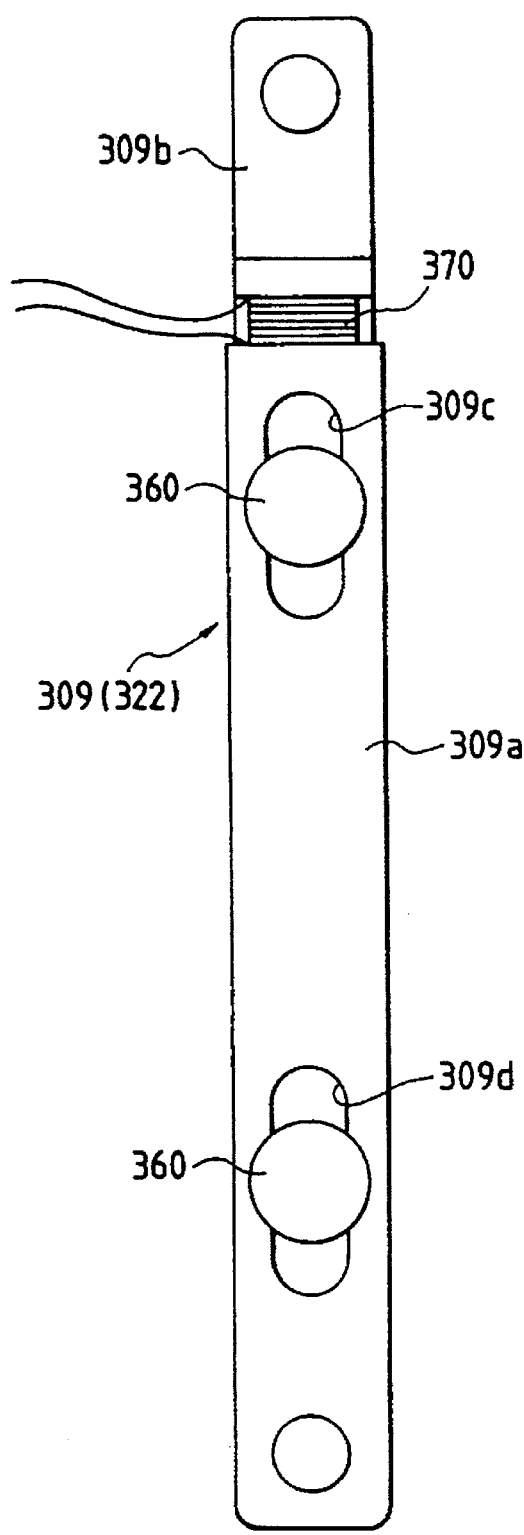
FIG. 13A and 13B are diagrams depicting a length adjusting device in a fifth embodiment of the lens driving apparatus of this invention.
Figure 13B:
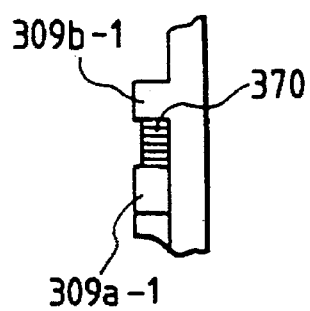

FIGS. 13A and 13B are views each illustrating details of the length adjusting device in a fifth embodiment of the lens driving apparatus of this invention. Note that the overall construction, other than the overall connection member is the same as that in FIG. 11, and hence the illustration is omitted. An explanation will be given, wherein the elements performing the same functions are marked with the like numerals. The main link member 309a engages with the adjustment link member 309b through the sleeves 360. The main link member 309a is formed with the elongate holes 309c, 309d in which the sleeves 360 are fitted. The link member 309 is so constructed as to be variable in its length only in the axial direction to connect the fulcrums.

A piezoelectric element 370 is joined between an end part 309a-1 of the main link member 309a and a protruded part 309b-1 of the adjustment link member 309b. The length of the piezoelectric element 370 is varied in the axial direction of the link member 309 by changing a voltage applied to this piezoelectric element 370. The length of the link member 309 can be thus varied.

Figure 14:
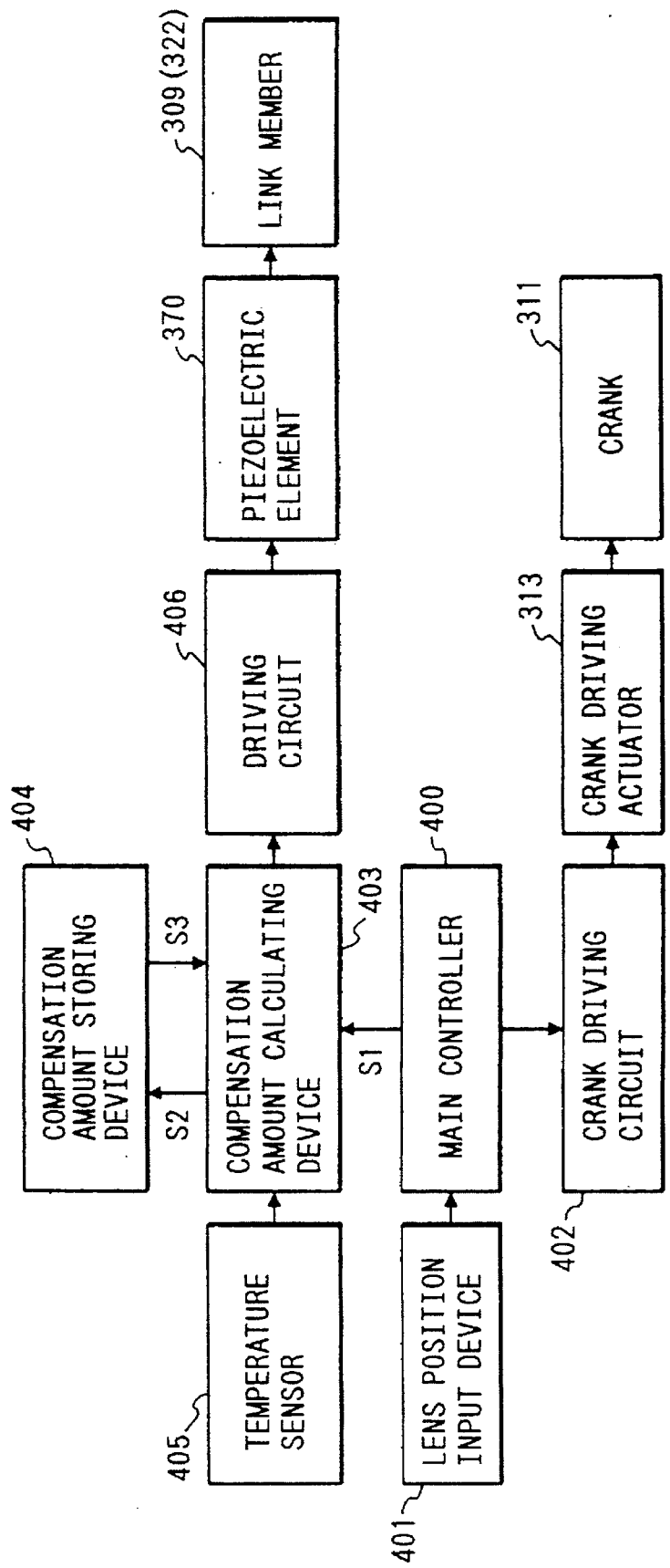
FIG. 14 is a block diagram illustrating the control layout of the lens driving apparatus in the fifth embodiment.

Next, the operation of the fifth embodiment will be explained in combination with the control circuit. FIG. 14 is a block diagram illustrating the control layout of the lens driving apparatus in the fifth embodiment.

A main controller 400 controls the whole of the lens driving apparatus in this embodiment. A lens position input device 401 inputs a position signal for determining a lens position. An output of this input device 401 is connected to the main controller 400. The main controller 400 transmits a control signal to a crank driving circuit 402 on the basis of the position signal from the lens position input device 401. A driving motor, i.e., a crank driving actuator 313 is thus driven. A crank 311 is thereby rotated to provide a crank angle corresponding to the lens position determined.

Here, the main controller 400, each time the crank 311 rotates through a predetermined angle, generates a signal S1 of crank position information at that time and outputs it to an amount-of-compensation calculating device 403. The amount-of-compensation calculating device 403 calculates an amount of compensation of the link member 309 on the basis of signals transmitted from the main controller 400, an amount-of-compensation storing device 404 and a temperature sensor 405.

The amount-of-compensation storing device 404 stores amount-of-compensation data of the link member 311 per temperature and position of the first movable lens group 302, the data being needed for compensating the manufacturing error. The amount-of-compensation data are obtained by measuring a deviation quantity of the optical performance in an after-the-assembly-adjustment state of the lens barrel at every temperature and in every position of the first movable lens group 302, obtaining an amount of compensation of the second movable lens group 303 in the optic axis direction that is required for compensating the deviation quantity and converting the amount of compensation into a driving quantity of the connection member 170 for performing the compensation in the optic axis direction.

The amount-of-compensation calculating device 403 reads the amount of compensation of the corresponding link member 309 from the amount-of-compensation storing device 404. This reading process is done based on the signal S1 of the crank position information inputted from the main controller 400 and the temperature information given from the temperature sensor 405.

The amount-of-compensation calculating device 403 obtains the driving quantity of the link member 309 on the basis of a signal S3 of the amount-of-compensation data read therefrom. The amount-of-compensation calculating device 403 transmits a driving signal to a driving circuit 406, and the piezoelectric element 370 is driven, thereby determining a position of the link member 309.

Incidentally, the explanation has been given by exemplifying the driving of the link member 309 in FIG. 14. However, the connection member of the compensation lever 320 to the link member 322 can be also driven with the same construction.

The construction is not confined to the embodiment discussed above but is modifiable and changeable in a variety of forms. Those are included in this invention.

For example, the explanation has been given by exemplifying the laminated type piezoelectric element as an actuator for driving the link members 309, 322. This may be replaced with an actuator involving the use of a servo mechanism which employs a motor.

Note that there may be made the length adjustment of both or any one of the link members 309, 322.

As discussed above, according to the fourth embodiment, the length of the first and/or second link member is adjustable. There is accordingly obtained such an effect that the deviation due to the manufacturing error of each several member can be compensated per member, and only the portion which causes the deviation can be efficiently modified.

Further, the length of the first and/or second link member is adjusted, and the position of each lens group can be shifted. It is therefore possible to compensate the manufacturing error with respect to the design value of the lens member. A desired value of the optical performance can be attained.

Stored at every necessary interval according to the fifth embodiment are the amounts of compensations of the first and second link members that are needed for determining the position of the second movable lens group with respect to the position of the first movable lens group. The length adjusting device is driven in accordance with the amount of compensation. Accordingly, there is obtained an effect in which the highly accurate positioning can be performed all the time irrespective of the lens position.

The fifth embodiment exhibits the following effect. The lengths of the first and second link members are adjustable even after the assembly adjustment. It is therefore feasible to deal with the dimensional variations derived from the changes in terms of temperature in the environment used that are caused after the final adjustment. This is done by measuring the temperature through the temperature detecting device and calculating the amount of compensation to provide an optimum value at that temperature.

Next, a sixth embodiment will be explained.

According to the first embodiment, the compensation cam plate 18 is movable with respect to the compensation cam fixing member 17 formed integrally with the support plate 8. The position of the compensation cam plate 18 is adjusted, thereby compensating the position of the second movable lens group 3 with respect to the first movable lens group 2. The focus shift or the like caused when changing the focal length of the lens system can be thus compensated.

In the lens driving apparatus in the first embodiment, however, though each member can be compensated to some extent by adjusting the position of the compensation cam plate 18, a degree of freedom for adjusting the compensation cam plate 18 is merely a combination of X- and Y-directional movements and a θ-directional rotation. It is therefore difficult to completely compensate the manufacturing error in the entire movable range.

Besides, when the second movable lens group 3 passes through the same portion on the compensation cam plate 18 several times during a movement of the crank 11 from one end to the other end of the movable range, viz., in the case of such an optical system that the second movable lens group 3 reciprocates, it follows that there exist a plurality of positions of the compensation cam plate 18 for compensating the manufacturing error. All of the states thereof are hard to compensate with a good accuracy.

Further, if the second movable lens group 3 reciprocates, a plurality of amounts of compensation of a approximate error relative to the slider crank mechanism exist in the same cam position. It is impossible to actualize a mechanism capable of compensation to a lens position within an allowable value in all of the plurality of positions in some cases.

Additionally, the compensation cam plate 18 is fixed after the assembly adjustment, and, therefore, it is difficult to deal with the dimensional variations derived from the changes in the temperature of the environment employed after the final adjustment.

Moreover, it is not easy to adjust the compensation cam plate 18 within the allowable range over the whole driving range with the combination of the X- and Y- directional movements and the θ-directional rotation.

The sixth embodiment will hereinafter be explained in greater detail with reference to the drawings.

Figure 15:
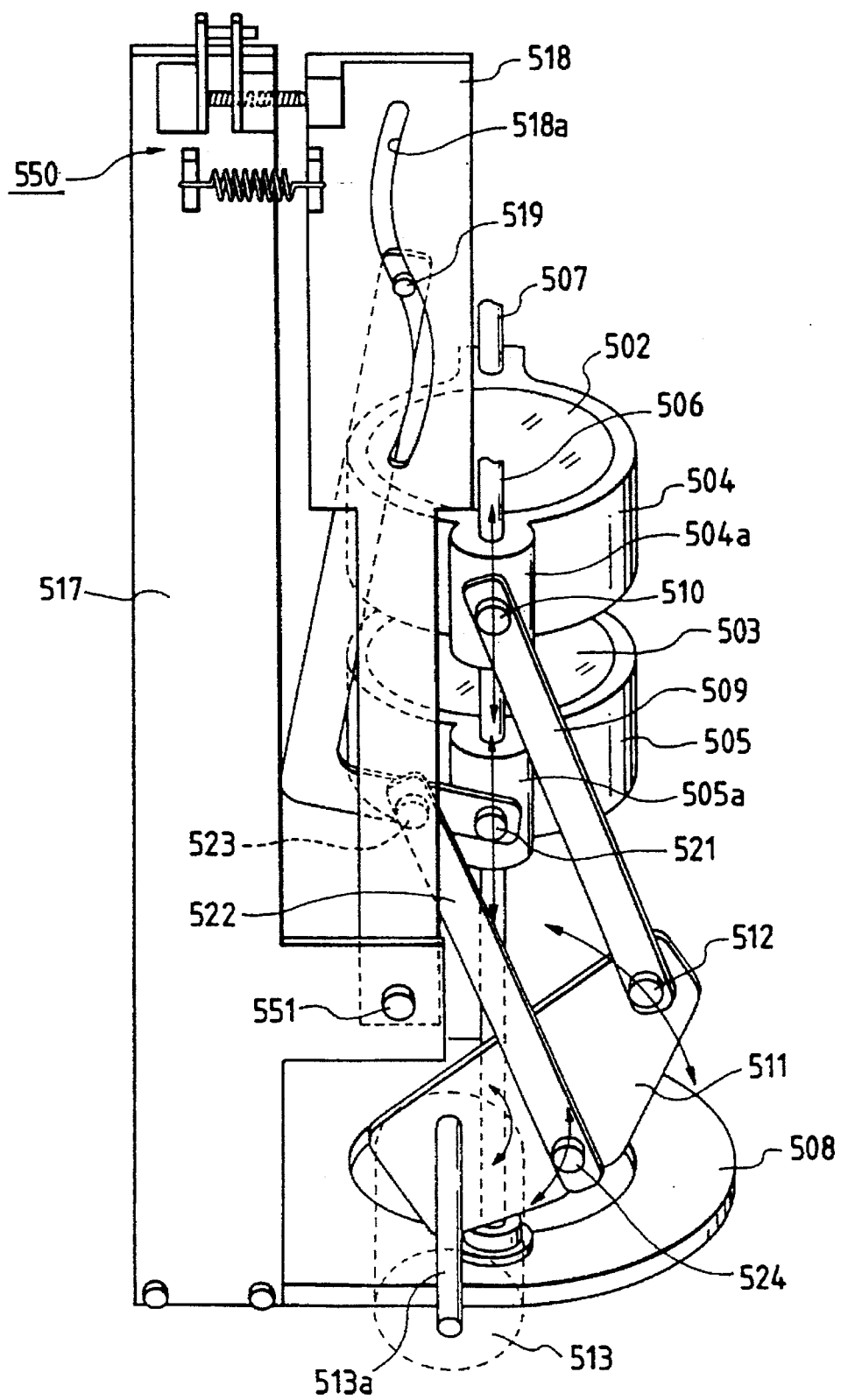
FIG. 15 is a diagram showing a sixth embodiment of the lens driving apparatus of this invention.

FIG. 15 is a diagram illustrating sixth embodiment of the lens driving apparatus of this invention. Note that elements performing the same functions as those of the basic construction are marked with the like numerals plus 500, and the repetitive explanations will be omitted.

In the lens driving apparatus in this embodiment, a compensation cam plate 518 is rotatably held by a holding member 517 fixed to a support board 508. The compensation cam plate 518 is so constructed as to be movable for compensation by means of a compensation cam plate driving device 550.

Figure 16:
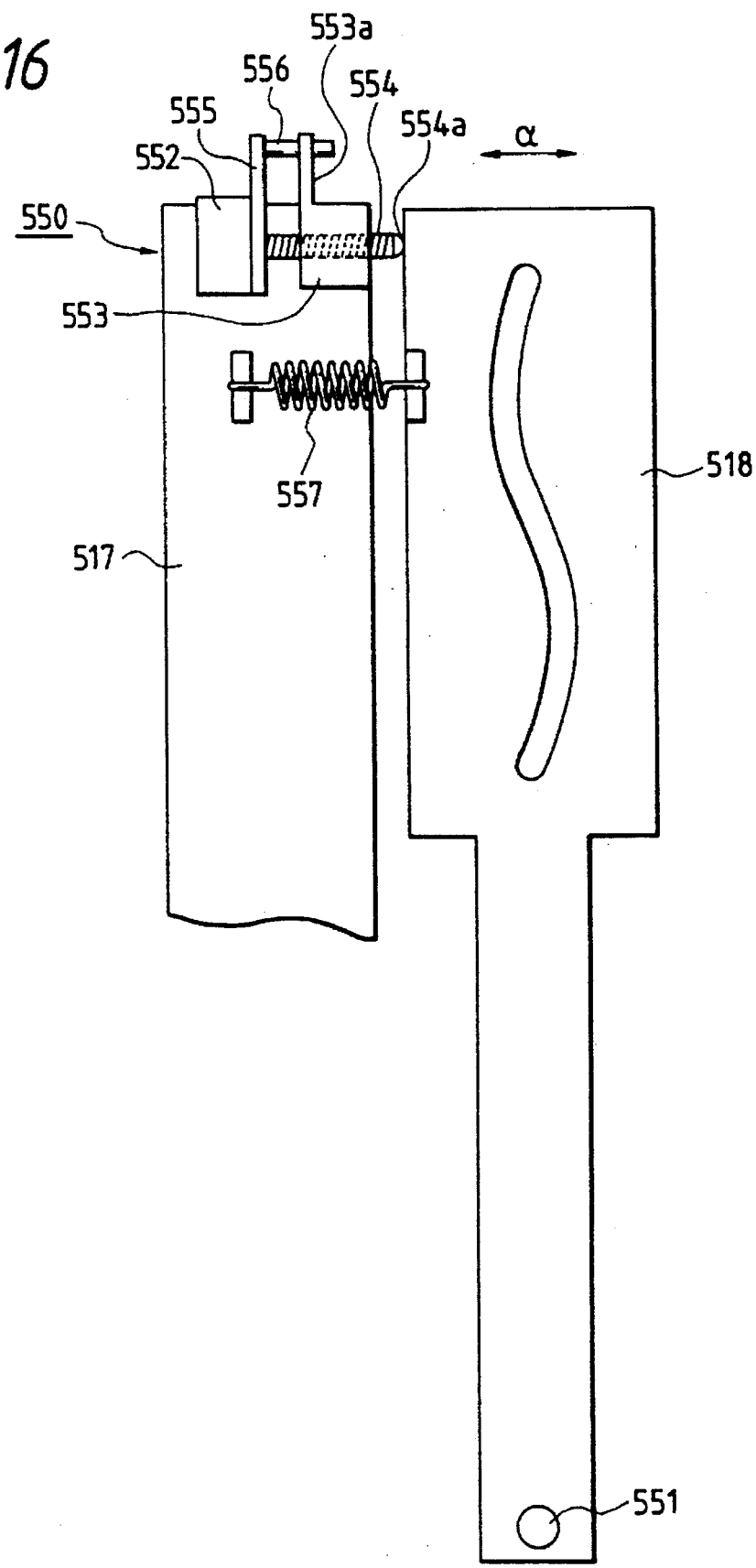
FIG. 16 is a frontal view illustrating a compensation cam plate driving device in the sixth embodiment of FIG. 15.

FIG. 16 is a frontal view showing the compensation cam plate driving device in the sixth embodiment of FIG. 15.

The compensation cam plate 518 is rotatably supported on the holding member 517, with a connection member 551 serving as a fulcrum (see FIG. 15). A stepping motor 552 is an actuator for driving the compensation cam plate 518. The stepping motor 552 is supported through a rotary shaft 554 on a support member 553 fixed to the holding member 517.

This rotary shaft 554 is formed with an external thread. An internal thread meshing with the rotary shaft 554 is formed in the support member 553. Further, the stepping motor 552 is provided with a flange 555. The flange 555 is fitted with a rotation stopper shaft 556. This rotation stopper shaft 556 engages with a guide part 553a of the support member 553 in such a way that the rotation stopper shaft 556 is movable in the axial direction of the rotary shaft 554 but is not rotatable in the peripheral direction of the rotary shaft 554. Hence, the stepping motor 552 rotates, with the result that the rotary shaft 554 moves in the axial direction.

Further, a tensile spring 557 is provided between the holding member 517 and the compensation cam plate 518. The compensation cam plate 518 is, when biased by this tensile spring 557, always pulled towards the holding member 517. Accordingly, the compensation cam plate 518 is in contact with a tip part 554a of the rotary shaft 554 all the time.

In this manner, the tip part 554a of the rotary shaft 554 contacts the compensation cam plate 518. The compensation cam plate 518 moves in an α-direction in the FIGURE with the movement of the tip part 554a of the rotary shaft 554. Consequently, the compensation cam plate 518 can be shifted to an arbitrary position within the movable range by regulating a rotary angle of the stepping motor 552.

Figure 17:
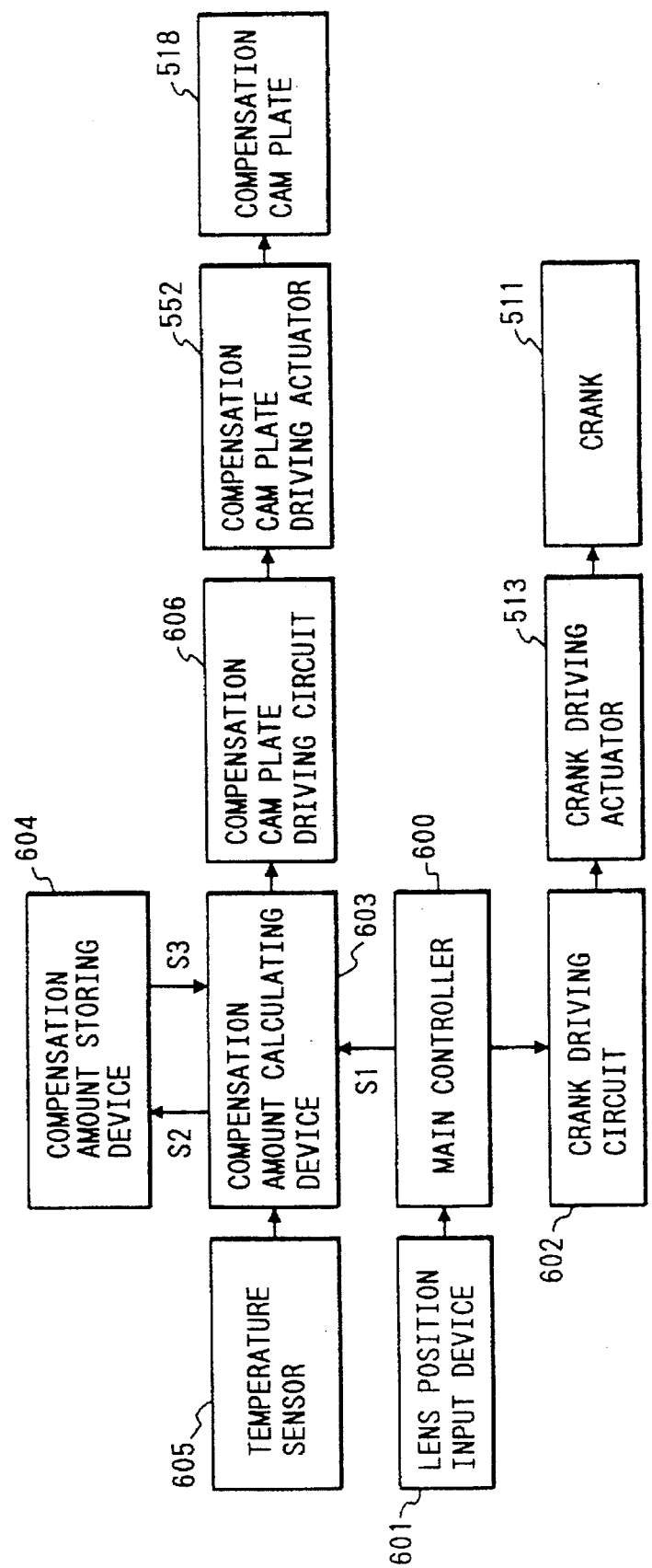
FIG. 17 is a block diagram depicting the control layout in the sixth embodiment of the lens driving apparatus of this invention.

Next, the operation of this embodiment will be explained together with the control circuit. FIG. 17 is a block diagram illustrating the control layout of the lens driving apparatus in the embodiment of this invention.

A main controller 600 controls the whole of the lens driving apparatus in this embodiment. A lens position input device 601 inputs a position signal for determining a lens position. An output of this input device 601 is connected to the main controller 600. The main controller 600 transmits a control signal to a crank driving circuit 602 on the basis of the position signal from the lens position input device 601. A driving motor, i.e., a crank driving actuator 513 is thus driven. A crank 511 is thereby rotated to provide a crank angle corresponding to the lens position determined.

Here, the main controller 600, each time the crank 511 rotates through a predetermined angle, generates a signal S1 of crank position information at that time and outputs it to an amount-of-compensation calculating device 603. The amount-of-compensation calculating device 603 calculates an amount of compensation of the compensation cam plate 518 on the basis of signals transmitted from the main controller 600, an amount-of-compensation storing device 604 and a temperature sensor 605.

The amount-of-compensation storing device 604 stores amount-of-compensation data of the compensation cam plate 518 per temperature and position of the first movable lens group 502, the data being needed for compensating the manufacturing error. The amount-of-compensation data are obtained by measuring a deviation quantity of the optical performance in an after-the-assembly-adjustment state of the lens barrel at every temperature and in every position of the first movable lens group 502, obtaining an amount of compensation of the second movable lens group 503 in the optic axis direction that is required for compensating the deviation quantity and converting the amount of compensation into a driving quantity of the compensation cam plate 518 for performing the compensation in the optic axis direction.

The amount-of-compensation calculating device 603 reads the amount of compensation of the corresponding compensation cam plate 518 from the amount-of-compensation storing device 604. This reading process is done based on the signal S1 of the crank position information inputted from the main controller 600 and the temperature information given from the temperature sensor 605.

The amount-of-compensation calculating device 603 obtains the driving quantity of the compensation cam plate 518 on the basis of a signal 3 of the amount-of-compensation data read therefrom. The amount-of-compensation calculating device 603 transmits a driving signal to a compensation cam plate driving circuit 606, and a compensation cam plate driving actuator (stepping motor) 552 is driven, thereby determining a position of the compensation cam plate 518.

In a video camera, etc., when effecting auto-focus, a micro-movement of a specific lens group is caused in the optic-axis direction with a given period. In many cases, a focusing direction is calculated by processing image data when moved.

For this reason, in the lens driving apparatus in this embodiment, the micro-movement of the compensation cam plate 518 is made by transmitting the signal from the main controller 600 so that the second movable lens group 503 makes a desired micro-movement. The second movable lens group 503 is thus moved.

The construction is not restricted to the embodiment discussed above but may be modified and changed in a variety of forms. Those are included in this invention.

For instance, the explanation has been given by exemplifying the stepping motor as the actuator for driving the compensation cam plate 518. The same effects are, however, obtained by replacing this stepping motor with an actuator such as a voice coil motor, a linear motor and a servo mechanism using a DC motor.

Besides, in accordance with this embodiment, the approximate error is compensated depending on a configuration of the cam groove of the compensation cam plate. Manufacturing errors are compensated by driving the cam plate. A part or the whole of the approximate error and manufacturing error can be also compensated in combination by driving the compensate cam plate. In this case, the configuration of the cam groove can be made moderate or rectilinear.

As discussed above in detail, according to the sixth embodiment, there is stored the amount of compensation of the compensation cam member at every necessary interval that is needed for determining the position of the second lens group with respect to the position of the first movable lens group. The compensation cam member is driven in accordance with the amount of compensation. It is therefore feasible to acquire the effect in which the positioning can be always done with high accuracy regardless of the lens position.

Further, the following effect is exhibited. When the second movable lens group passes through the same portion on the compensation cam member several times during the movement of the crank from one end to the other end of the movable range, viz., in the case of such an optical system that the second movable lens group reciprocates, the amount of compensation of the approximate error and the manufacturing error corresponding to the position of the first lens group is read each time from the amount-of-compensation storing device. The compensation cam member is driven based on the amount of compensation. The second movable lens group undergoes the highly accurate positioning with respect to the first movable lens group.

In accordance with the sixth embodiment, the following effect is provided. The compensation cam member is driven so that the second movable lens group makes the micromovement in the optic axis direction. It is accordingly possible to perform the lens drive for creating an image signal required for controlling the auto-focus of the lens.

The sixth embodiment also exhibits the following effect. The compensation cam member can be driven even after the assembly adjustment. It is therefore feasible to deal with the dimensional variations due to the changes in the temperature of the environment employed that are produced after the final adjustment. This is done by measuring the temperature through the temperature detecting device and calculating the amount of compensation to provide the optimum value at that temperature.

A seventh embodiment will next be explained.

In the lens driving apparatus, the second link member 22 serves to perform the approximate positioning of the second movable lens group 3 with respect to the precise set position. Further, the compensation lever 20 is capable of moving the second movable lens group 3 to a normal position. It is because the moving quantity for compensation is set with the movement of the cam follower 19 engaging with the compensation cam plate 18.

In the lens driving apparatus in accordance with the first embodiment, manufacturing errors exist. In some cases, there arises a necessity for compensation, to the design value, the mutual positional relationship between the first and second movable lens groups 2, 3 as well as the positional relationships of the first and second movable lens groups 2, 3 with respect to the whole lens system in order to satisfy the optical performance. This compensation is attained by adjusting the position of the compensation cam plate 18 and changing the positional relationship of the second movable lens group 3 with the first movable lens group 2.

Figure 18:
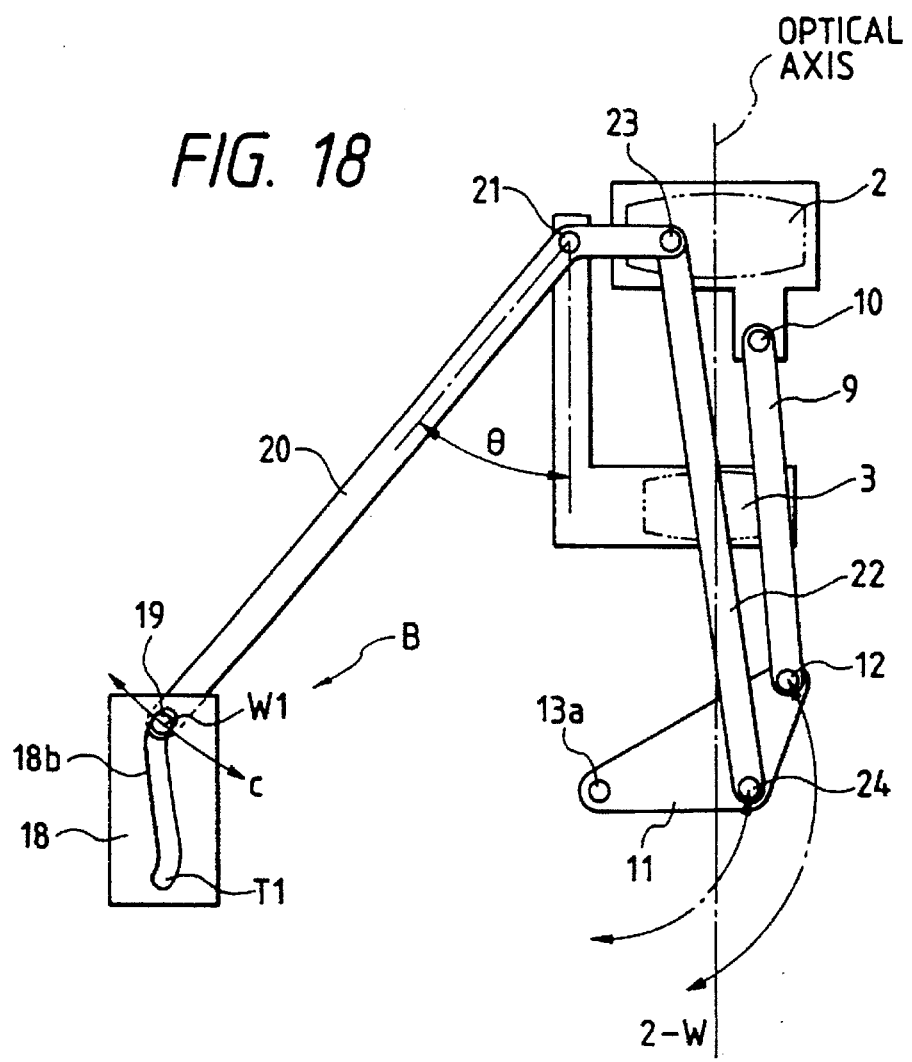
FIG. 18 is a schematic diagram showing a positional relationship of respective members of the lens driving apparatus of FIG. 1.

FIG. 18 is a schematic diagram illustrating a positional relationship of each member of the lens driving apparatus of FIG. 1.

In this lens driving apparatus, as depicted in FIG. 18, there is arbitrarily set an angle θ made by a straight line with respect to a guide shaft 6 of the second movable lens group 3, this straight line connecting the cam follower 19 to a link member 21 for linking the compensation lever 20 to the second movable lens group 3.

Note that the configurations and positions of the compensation lever 22, the compensation cam plate 18 and the link members 21, 22 are different from those in the arrangement of FIG. 1 but equivalent in terms of mechanism in FIG. 18.

In this lens driving apparatus, the cam follower 19 is moved in the peripheral direction (c-direction in FIG. 18) about the link member 21 between the compensation lever 20 and the second movable lens group 3. This is intended to compensate the approximate error due to the approximate positioning of the second movable lens group 3 and to adjust the position when assembled.

That is, the deviation quantity of the optical performance due to the manufacturing error of the lens barrel constructive members such as the lens members and mechanism members can be adjusted by adjusting the position of the compensation cam plate 18 during the assembly adjustment.

However, if the above angle θ is large, there arises a problem of decreasing the degree of freedom of the positional adjustment of the second movable lens group 3 when adjusting the position of the compensation cam plate 18.

For example, during the assembly adjustment of the lens driving apparatus shown in FIG. 18, the cam follower 19 satisfies the optical performance under the present condition in a position T1 of the cam groove 18b, and, therefore, no adjustment is made. In the vicinity of a position W1 of the cam groove 18b, however, the optical performance is not met. Hence, it is considered that the position of the second movable lens group 3 is adjusted by adjusting the compensation cam plate 18.

Figure 19:
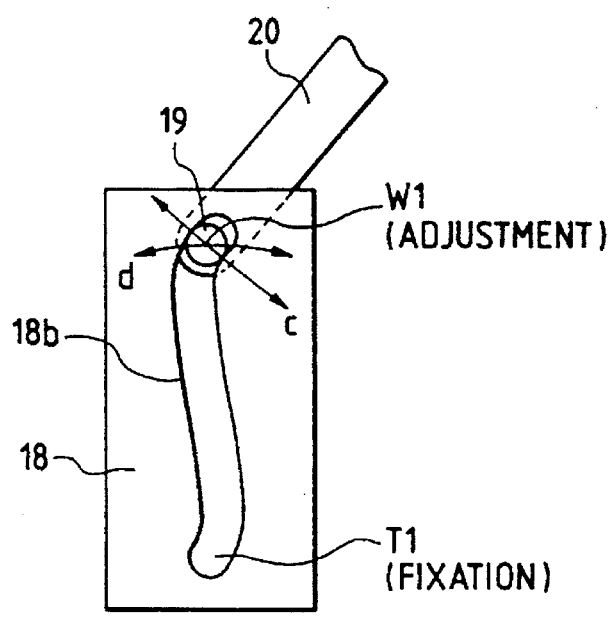
FIG. 19 is an enlarged view of a compensation cam plate of FIG. 18.

FIG. 19 is a view illustrating a member B (compensation cam plate member) of FIG. 18. In this case, the position T1 of the cam groove 18b is not shifted, but it is necessary to adjust the position W1 in the c-direction of FIG. 19. When the position T1 is not shifted but fixed, an adjustable direction of the position W1 is only an arrowed d-direction. It is difficult to freely adjust the position in the arrowed c-direction.

As described above, the degree of freedom for the adjustment is decreased, and the positional adjustment of the second lens group 3 through the compensation cam plate 18 is therefore difficult and complicated. There exists such a problem that the desired optical performance is hard to attain only adjusting the compensation cam plate 18 as the case may be.

Figure 20:
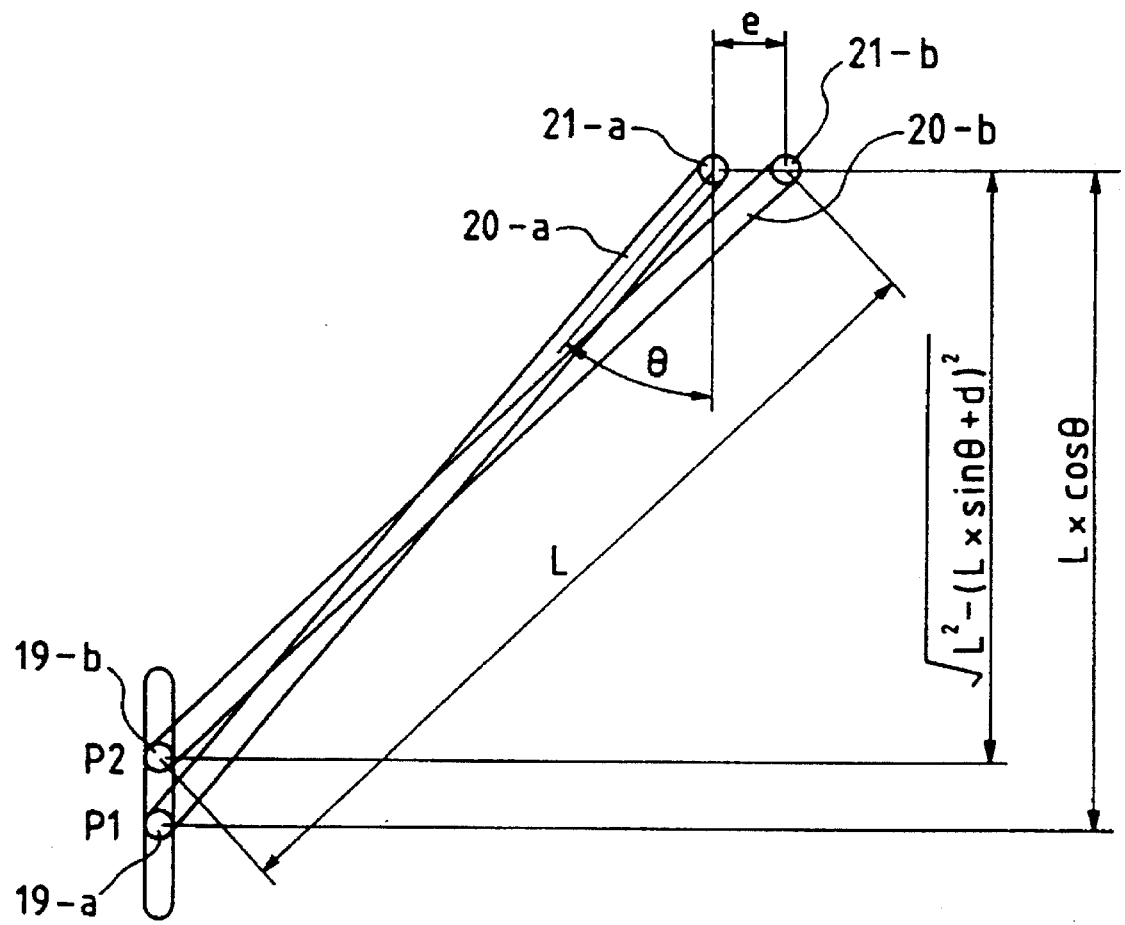
FIG. 20 is a diagram showing variations in position occupied by a cam groove that are caused due to an error of a guide shaft of the lens driving apparatus of FIG. 1.

FIG. 20 is a view illustrating variations in use position of the cam groove that are produced due to an error of the guide shaft of the lens driving apparatus of FIG. 1. Note that the cam groove takes a rectilinear configuration for simplifying the explanation in FIG. 20, while there is ignored a shift quantity of the position of the movable lens group which is attributed to the slider crank mechanism on the driving side when the guide shaft is deformed.

The guide shaft 6 is provided for guiding the second movable lens group 3 in the optic axis direction. There is a possibility in which an error may be induced in the guide shaft 6 in the perpendicular direction due to many factors such as: (1) an undulation produced when manufacturing the guide shaft 6; (2) a deformation by an external force and when fixing the guide shaft 6; (3) a deformation by weights of the first and second movable lens groups 2, 3 movably fixed to the guide shaft 6 or by a force acting on the guide shaft 6 when driving the first and second movable lens groups 2, 3; and (4) a deformation by changes in the temperature.

In this case, the second movable lens group 3 moves on the guide shaft 6 along the undulation. Consequently, a link member 21-a between the second movable lens group 3 and the compensation lever 20 shifts to a position 21-b by a shift quantity e. Herein, the position of the link member 21 shifts by the shift quantity e, and therefore the position of the cam follower 19 in the cam groove 18b also shifts from P1 to P2 in the FIGURE. In this case, $P1=L \times \cos\theta$, and $P2=(L^2 \times (L \times \sin\theta+d)^2)^{1/2}$. Namely, the guide shaft 6 is deformed, with the result that a difference given by P1–P2 is produced in the using position of the cam groove 18b. Therefore, the position of the movable lens group 2 shifts, resulting in such problem that an influence is exerted on the optical performance.

The seventh embodiment aims at obviating the problems described above.

The seventh embodiment will hereinafter be discussed in greater detail with reference to the drawings.

Figure 21:
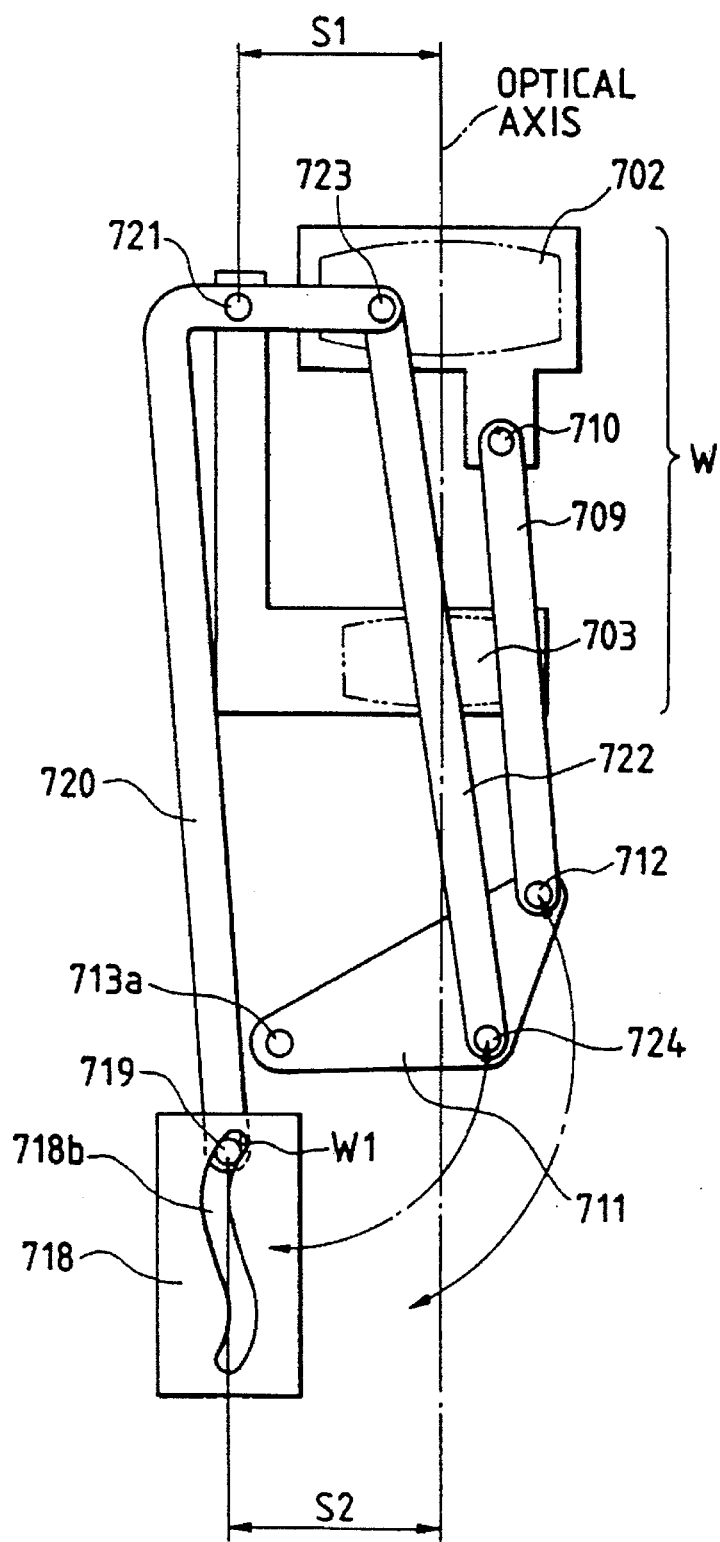
FIG. 21 is a schematic diagram showing a seventh embodiment (wide-angle side) of the lens driving apparatus of this invention.
Figure 22:
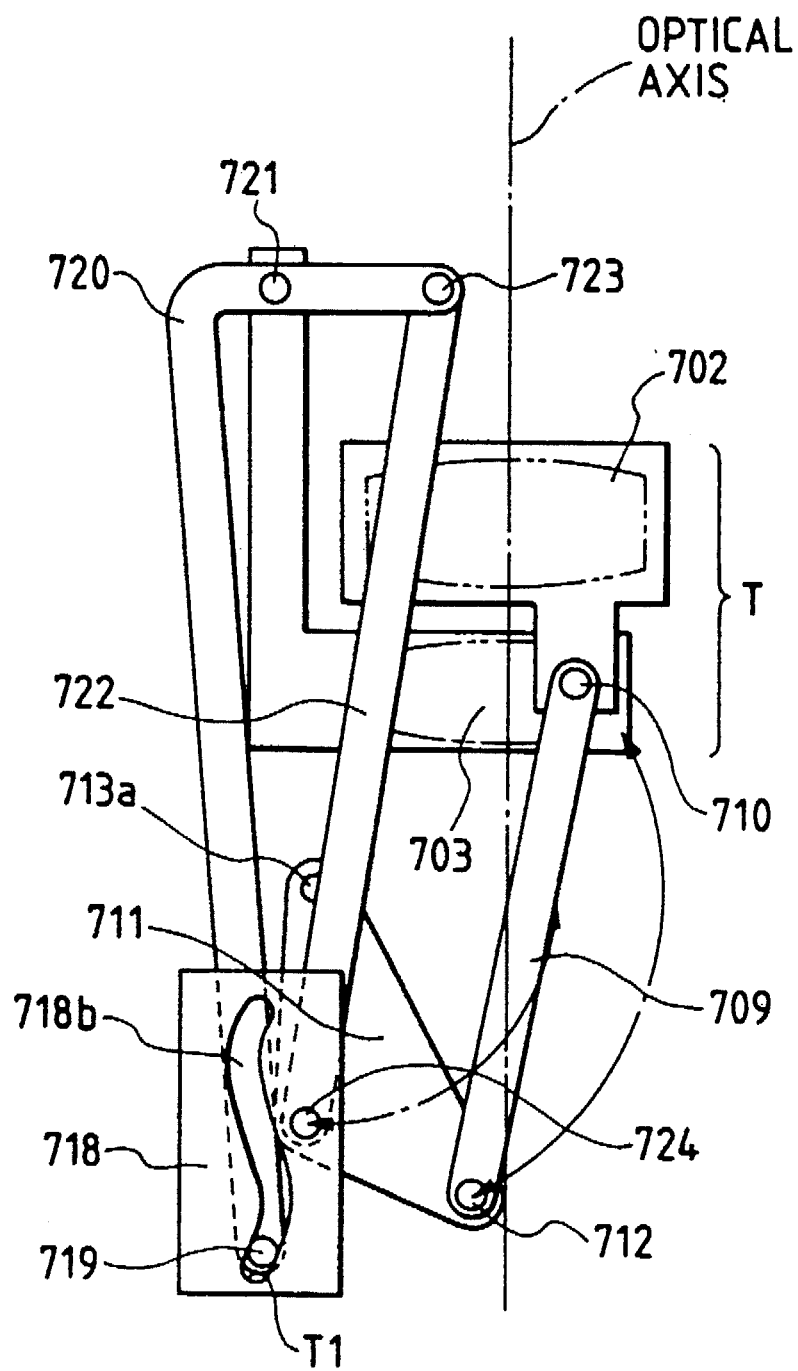
FIG. 22 is a schematic diagram showing the seventh embodiment (telephoto side) of the lens driving apparatus of this invention.

FIG. 21 and 22 are schematic diagram each illustrating the seventh embodiment of the lens driving apparatus according to this invention. Note that the elements performing the same functions in the first embodiment are marked with the like numerals plus 700, and repetitive explanations will be omitted.

In the lens driving apparatus in the seventh embodiment, a cam plate 718 has a cam groove 718b assuming a cam curve with a predetermined configuration. The cam groove 718b is disposed on a straight line passing through a link member 721 and parallel to the guide shaft 6. The cam groove 718b may also be disposed on the plane substantially perpendicular to a trajectory plane of the compensation lever 720, parallel to the guide shaft 6 of a second movable lens group 703 and including the link member 721 between the second movable lens group 703 and a compensation lever 720. Further, the configuration of the cam groove 718b of the compensation cam plate 718 is not limited to the rectilinear line. Hence, all the cam curves are not necessarily arranged in the same way as the above-mentioned, but it follows that the longitudinal direction of the cam curve is substantially coincident with the above-mentioned arrangement.

More specifically, a length and a position of each of the several constructive member, and a rotary angle of a crank 711 and a radius of rotation of the fulcrum of each of the link members 709, 722 are determined in accordance with the optical system so that s1 and s2 are set substantially in the same position in FIG. 21. The lens driving apparatus in this embodiment is thus constructed.

FIGS. 21 and 22 illustrate how the lens driving apparatus in the seventh embodiment is incorporated into the zoom lens barrel. The crank 711 rotates, thereby driving the first and second movable lens groups 702, 703. The first and second movable lens groups 702, 703 are movable in a moving range from a wide-angle position W of FIG. 21 to a telephoto position T of FIG. 22. Here, a cam follower 719 moves between the position W1 of the cam groove 718b of the compensation cam plate 718 in FIG. 21 and the position T1 in FIG. 22.

With a rotation of the crank 711, the first and second movable lens groups 702, 703 are positioned at an arbitrary angle between the wide-angle position W and the telephoto position T. Then, the position of the first movable lens group 702 is determined per angle. Furthermore, the second movable lens group 703 is positioned by the cam groove 718b of the compensation cam plate 718 through the compensation lever 720.

At this time, in the lens driving apparatus in this embodiment, the above angle θ is substantially zero. Accordingly, when making the above-mentioned adjustment in FIG. 18, the position T1 is not shifted but fixed, while the position W1 is adjusted. Here, the adjustment can be freely made substantially in the arrowed c-direction. Accordingly, the degree of freedom of the adjustment increases. The positional adjustment of the second movable lens group 703 with aid of the compensation cam plate 718 can be facilitated and simplified. A desired optical performance can be attained more easily than in the prior arts.

Further, in FIG. 20, when $\theta \cong 0$, $P1 = L \times \cos\theta \cong L$, and $P2 = (L^2 - (L \times \sin\theta + d)^2)^{1/2} \cong (L^2 - d^2)^{1/2}$. Besides, if d is herein well smaller than L, $(L^2 - d^2)^{1/2} \cong L$, and $P1 \cong P2$. That is, even when the guide shaft 6 is deformed, almost no difference is produced in the positions occupied by the cam groove 718b.

Therefore, the position of the second movable lens group 703 does not shift, and no influence is exerted on the optical performance.

The construction is not confined to the embodiment discussed above but modifiable and changeable in many forms, and those are included in this invention.

The explanation of this embodiment has been made by giving the case where s1 is coincident with s2 in FIG. 21. For convenience in terms of design, however, some deviation between s1 and s2 may be permitted.

Further, the link member 721 and the cam follower 719 are not necessarily located on the same plane of the sheet surface, depending on the relationship of arrangement of other members. The compensation lever 720 may be tilted in the direction perpendicular to the sheet surface or bent in a crank-like shape.

As discussed above, the present invention provides the following effects. It is possible to increase the degree of freedom when adjusting the deviation quantity of the optical performance due to manufacturing errors of the lens barrel constructive members such as the lens members and mechanism members by adjusting the position of the compensation cam plate during the assembly adjustment. The adjustment is thus facilitated.

In addition, the error is caused in the support element in the perpendicular direction because of the undulation and deformation of the support element such as the guide shaft for guiding the second movable lens group in the optic axis direction. In such a case also, the influence on the positional error of the second movable lens group due to the above error can be decreased.

Next, an eighth embodiment will be explained.

In the lens driving apparatus depicted in FIG. 1, there are not specifically set but freely set the angles of the link member 9 for driving the first movable lens group 2 and of the link member 22 for driving the second movable lens group 3 in the entire driving range of the crank 11, i.e., angle β1, β2 through which the link member 9 or 22 is movable with respect to the guide shaft 6 in FIG. 1.

The guide shafts 6, 7 serve to guide the first and second movable lens groups 2, 3 in the optic axis direction. There exists a possibility in which errors may be induced in the guide shafts 6, 7 in the perpendicular direction due to many factors such as: (1) the undulations produced when manufacturing the guide shafts 6, 7; (2) deformations by an external force and when fixing the guide shafts 6, 7; (3) deformations by weights of the first and second movable lens groups 2, 3 movably fixed to the guide shafts 6, 7 or by forces acting on the guide shafts 6, 7 when driving the first and second movable lens groups 2, 3; and (4) deformations by changes in the temperature.

Figure 23:
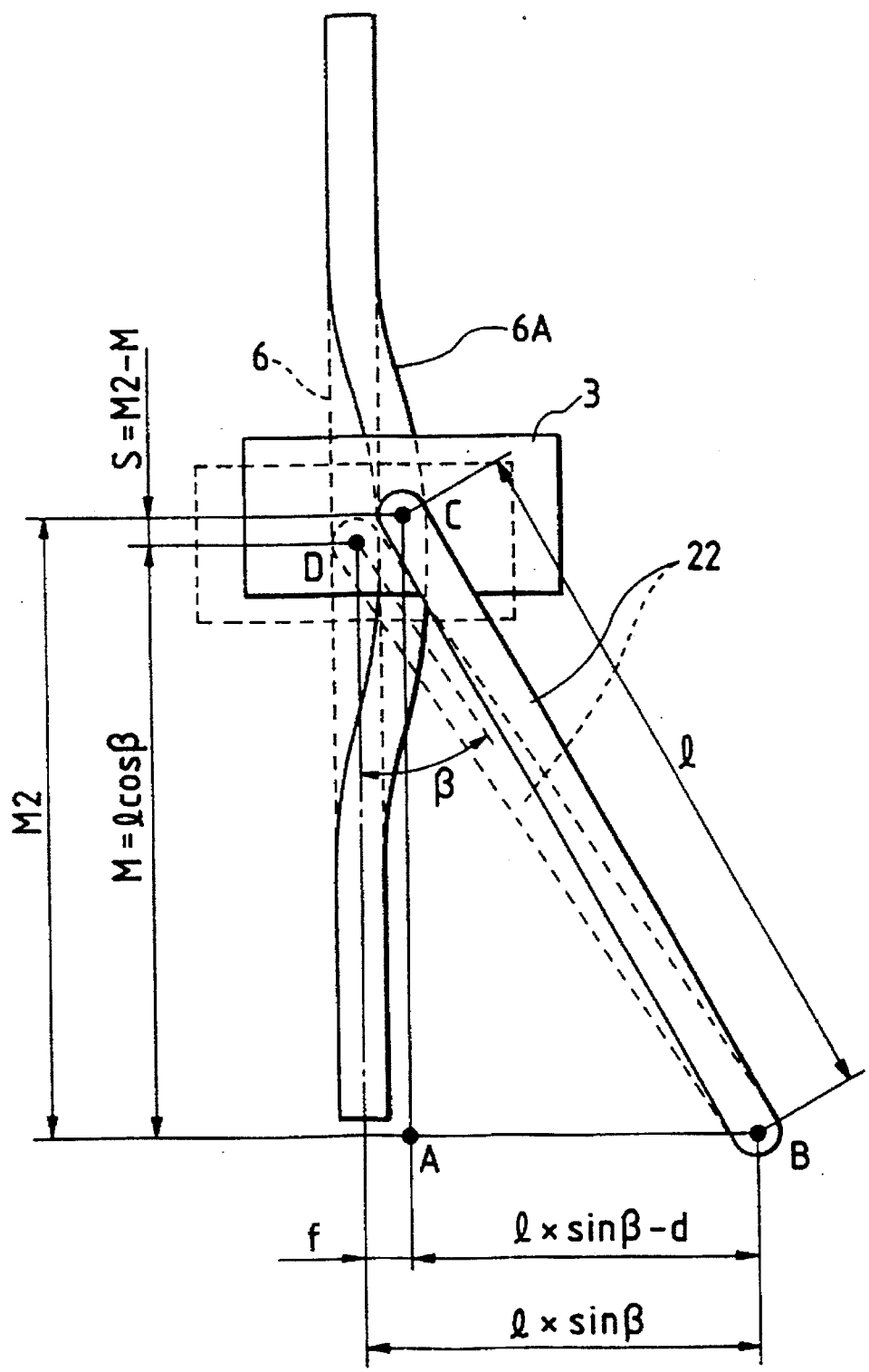
FIG. 23 is a diagram showing an influence on a position of the movable lens group, depending on a deformation quantity of the guide shaft.

If deformed as in the case of a guide shaft 6A of FIG. 23, the second movable lens group 3 moves on the guide shaft 6A along the undulation thereof. In this instance, it follows that the second movable lens group 3 is positioned apart by a distance f from the fiducial guide shaft 6. Further, a fulcrum B (a link member 24) of the link member 22 on the side of the crank 11 is fixed. Therefore, a positional error is produced in the position of the second movable lens group 3 in the optic axis direction due to the deformation of the guide shaft 6. The error influences the optical performance. This is the same with the influences on the first movable lens group 2 and the link member 9.

Namely, if the angles between the guide shafts 6, 7 and the link members 9, 22 are freely set without regulating the angular relationships therebetween, the errors in the guide shafts 6, 7 lead to large positional deviation of the first and second movable lens groups 2, 3. Additional problems are that the tolerance to the guide shafts 6, 7 is strictly settled, or it is necessary to take a structure enough to reduce the deformations of the guide shafts 6, 7 due to a variety of factors.

Moreover, the following problems arise. If the lengths of the link members 9, 22 change due to thermal deformations, then values produced in the form of errors of the shift quantities of the first and second movable lens groups 2, 3 vary with changes in the angles $\beta 1$, $\beta 2$ made by the link members 9, 22 and the guide shafts 6, 7 of the first and second movable lens groups 2, 3. Errors larger than the dimensional variations due to the thermal deformations are induced in the first and second movable lens groups 2, 3.

The eighth embodiment aims at obviating the problems described above.

The eighth embodiment will hereinafter be discussed in greater detail with reference to the drawings.

Figure 24:
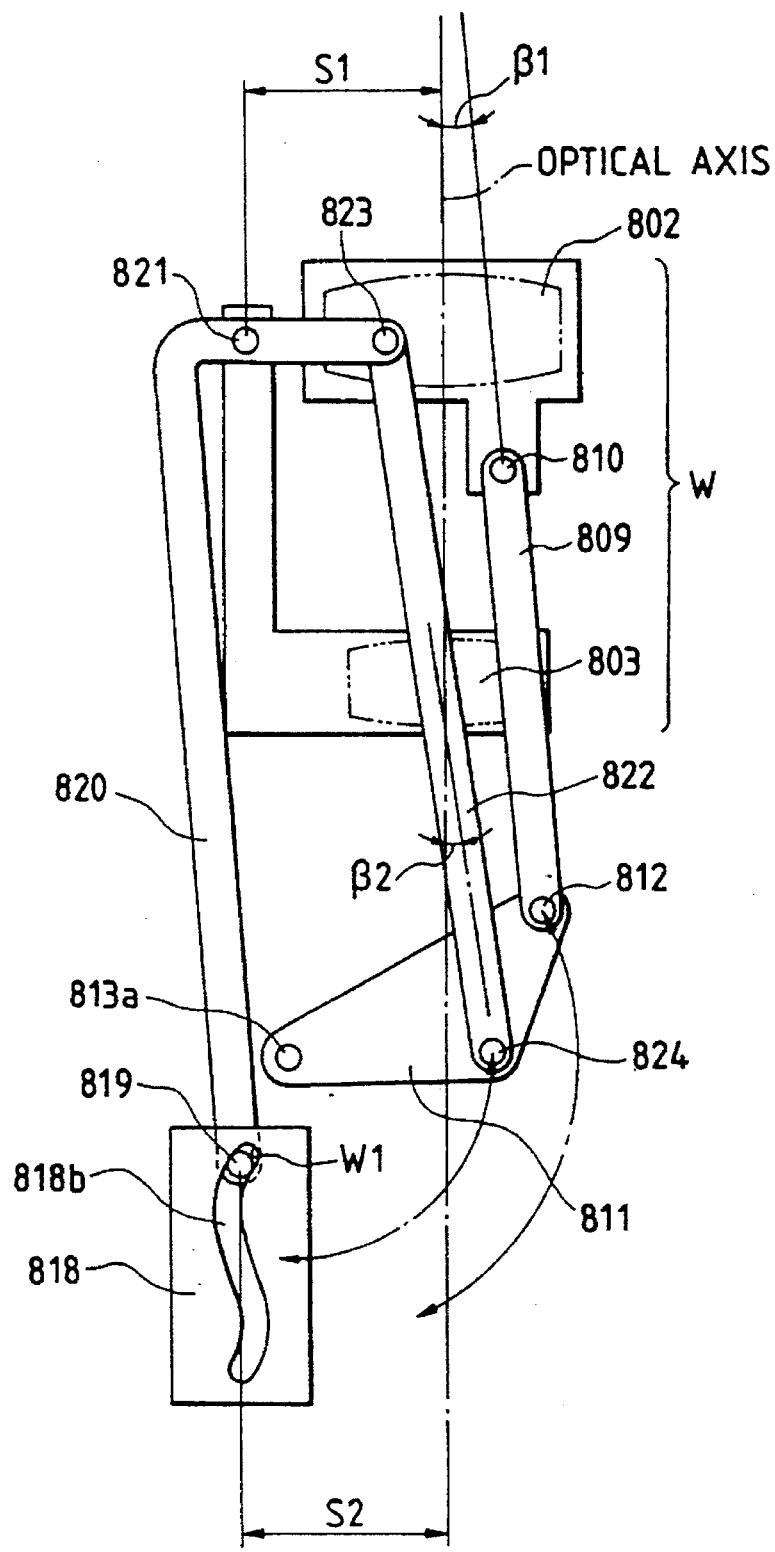
FIG. 24 is a schematic diagram showing an eighth embodiment (wide-angle side) of the lens driving apparatus of this invention.
Figure 25:
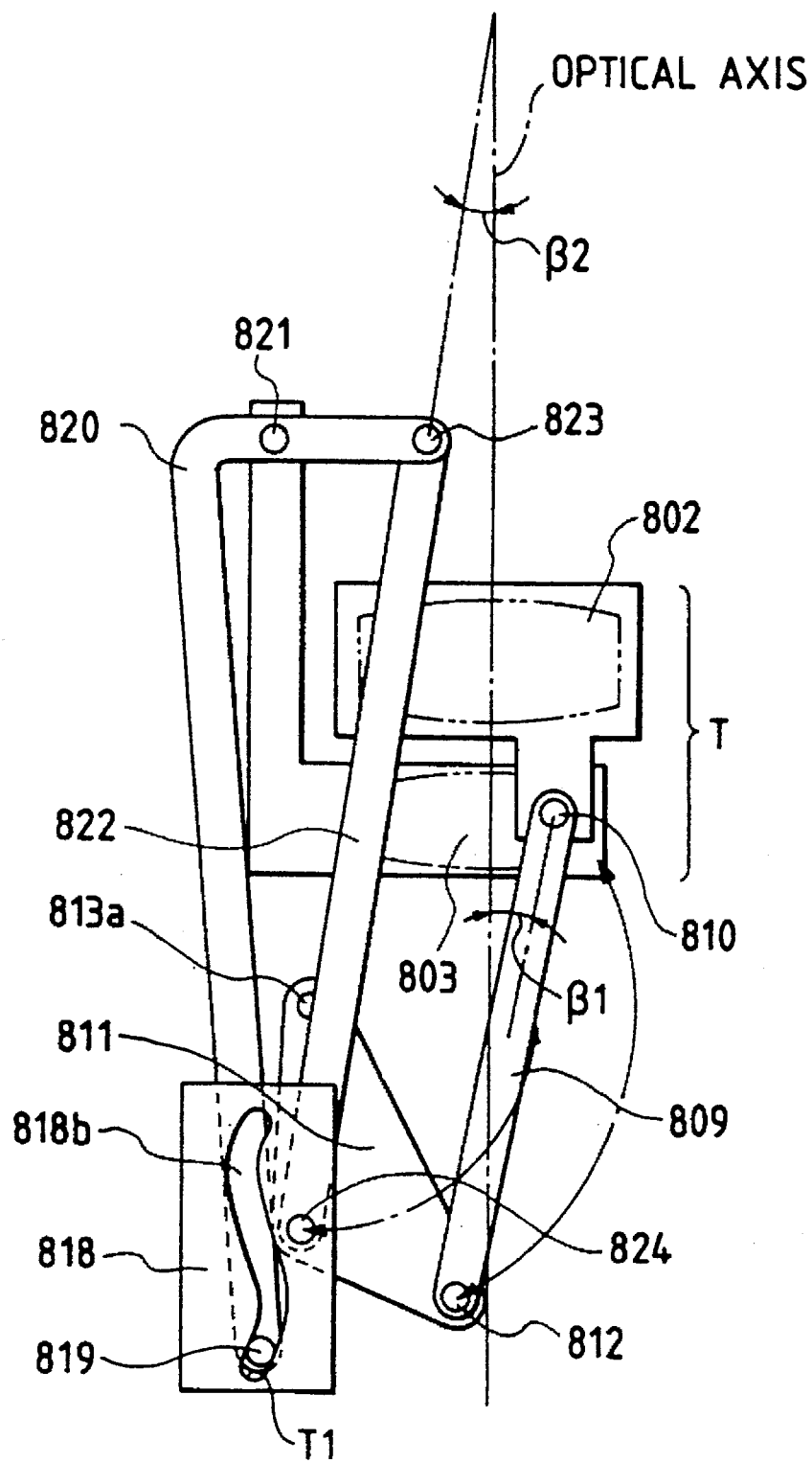
FIG. 25 is a schematic diagram showing the eighth embodiment (telephoto side) of the lens driving apparatus of this invention.

FIG. 24 and 25 are schematic diagrams illustrating the eighth embodiment of the lens driving apparatus according to this invention. Note that the elements performing the same functions in the first embodiment are marked with the like numerals plus 800, and repetitive explanations will be omitted.

In the lens driving apparatus in this embodiment, a link member 809 is set so that the angle $\beta 1$ made by a line of connecting the link members 810, 812 serving as fulcrums and the optic axis, viz., the guide shaft comes to have a substantially small angle from a parallel state over the entire area within the driving range of the link member 809. Further, a link member 822 is set so that the angle $\beta 2$ made by a line of connecting link members 823, 824 serving as fulcrums and the optic axis, i.e., the guide shaft comes to have a substantially small angle from the parallel state in some area within the driving range of the link member 822.

That is, the lens driving apparatus in this embodiment is constructed as follows. The link member 809 of a first movable lens group 802 and the link member 822 of a second movable lens group 803 are disposed to determine lengths and positions of the respective constructive members, a rotary angle of a crank 811 and radiuses of rotation of the fulcrums (connected portions) of the link members 809, 822 in accordance with the optical system so that the angle $\beta$ made by a line of connecting connection members 810, 812 or connection members 823, 824 becomes a substantially small angle from the state of being parallel to the guide shafts of the first and second lens groups 802, 803 in some area within the driving range thereof.

FIGS. 24 and 25 each illustrate how the lens driving apparatus in this embodiment is incorporated into the zoom lens barrel. The crank 811 rotates, thereby the first and second movable lens groups 802, 803 are driven along the guide shaft, i.e., the optic axis through the link members 809, 822, respectively. The first and second movable lens groups 802, 803 are movable in the moving range from the wide-angle position W of FIG. 24 to the telephoto position T of FIG. 25. Here, a cam follower 819 moves between the position W1 of a cam groove 818b of a compensation cam plate 818 in FIG. 24 and the position T1 in FIG. 25.

With a rotation of the crank 811, the first and second movable lens groups 802, 803 are positioned at an arbitrary angle between the wide-angle position W and the telephoto position T through the link members 809, 822, respectively. Then, the position of the first movable lens group 802 is determined per angle. Furthermore, the second movable lens group 803 is positioned by the cam groove 818b of the compensation cam plate 818 through a compensation lever 820 and the link member 812.

FIG. 23 is a view showing an influence by a deformation quantity of the guide shaft on the position of the movable lens group. Referring to FIG. 23, when the fiducial position is the fulcrum B (link member 24) on the side of the crank 11 of the link member 22, a design position M of the second movable lens group 3 is given by $M=1\cos\beta$, where f is the deviation quantity from the fiducial guide shaft 6 when the movable lens group 3 moves along the deformed guide shaft 6A, 1 is the length of the link member 22, and $\beta$ is the angle made by the design guide shaft 6 and an axis of connecting the fulcrums of the link member 22. If there is the error quantity f, a position M2 of the second movable lens group 3 on the assumption of a triangle ABC is expressed such as $M2=(1^2-(1\sin\beta-f)^2)^{1/2}$. Hence, a positional error quantity s of the second movable lens group 3 in the optic axis direction is given by $s=M2-M$.

Herein, the lens driving apparatus in the eighth embodiment is applied to a presently designed high-performance lens. In this case, a degree of rectilinear propagation of the first and second movable lens groups along guide rails or the like used as guide shafts is on the order of ±20 μm, depending on an accuracy and a fixed state of the guide rail simplex. Further, the allowable error in the first and second movable lens groups in the optic axis direction due to the influence by the error of the guide shaft is on the order of 5–6 μm to satisfy the optical performance.

Figure 26:
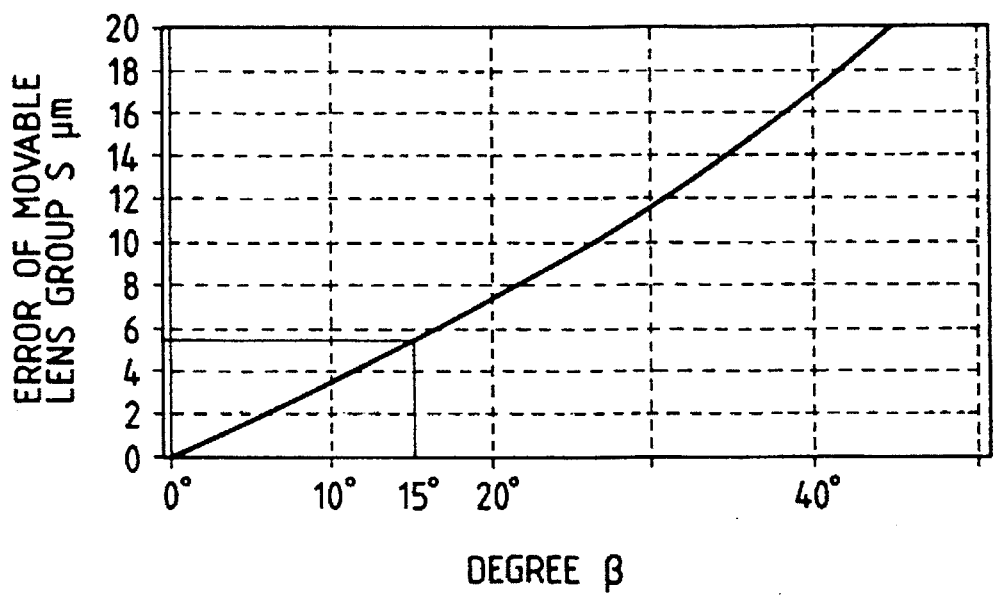
FIG. 26 is a diagram showing a relationship between angle $\beta$ of the link member and a positional error quantity S of the movable lens group.

FIG. 26 is a diagram showing a relationship of the link member angle $\beta$ versus the positional error quantity s of the movable lens group. Shown therein is a relationship of the angle $\beta$ versus the error quantity s, wherein the length 1 of the link member 22 is set to 100 mm, and the deviation quantity f from the guide shaft 6 is set to 20 μm in FIG. 23. The axis of abscissa indicates the angle $\beta$ of the link member 22, while the axis of ordinate indicates the error quantity s of the second movable lens group 3.

Herein, the error of the second movable lens group 3 becomes 5–6 μm when the angle $\beta 2$ is set such as $\beta 2=15$ degrees or less, this angle being made by the line, to connect the connection members 23, 24, of the link member 22 for driving the second movable lens group 3 and by the guide shaft 6 of the second movable lens group 3. Even if the error is produced in the guide shaft 6, the error of the second movable lens group 3 in the optic axis direction can be restrained within the allowable range.

Namely, the construction is done so that the angles $\beta$ ($\beta 1$, $\beta 2$) become substantially small angles, these angle being made by the lines, to connect the respective fulcrums (connection members 810, 812 and connection members 823, 824), of the link members 809, 822 of the first and second lens groups 802, 803 and by the guide shafts, i.e., the optic axis. It is thus possible to decrease the influences exerted by the deformation quantities of the guide shafts on the errors of the first and second movable lens groups 802, 803.

The construction is not limited to the eighth embodiment discussed above but may be modifiable and changeable in a variety of forms, and those are included in the present invention.

For instance, the explanation has been made by giving the example where both of the angles $\beta 1$, $\beta 2$ are very small angles. The same effect is, however, exhibited if any one of the angles is small. Furthermore, when the angle $\beta$ deflects on both sides of the guide shaft, the angle having a larger deflection is preferably set at the small angle described above.

Further, the construction in this embodiment is that β1, β2 become the above small angles within the entire driving range of the link members 809, 822. There is also, however, adoptable such a construction that the angles are not set small in a portion having a less influence of the optical performance with respect to the deviation quantity of the movable lens group in the optic axis direction and in a portion having a large allowable range of the optical performance.

As discussed above in detail, the lens driving apparatus of this invention is employed for the members constituting the optical system in which the optical performance is determined by the mutual positional relationship between the plurality of movable lens groups. The present invention therefore exhibits the following effects.

To start with, even when the error is produced in the direction perpendicular to the axis of the guide shaft due to the deformation in the guide shaft constituting the support element, the error of the movable lens group in the optic axis direction can be restrained small relative to the error quantity of the guide shaft. Consequently, the position of the movable lens group in the optic axis direction is hard to undergo the influence by the error quantity of the guide shaft.

Further, a less amount of influence by the error of the guide shaft is exerted on the position of the movable lens group in the optic axis direction. Hence, the linearity of the guide shaft is decreased in terms of accuracy in a range enough not to influence other performances. The costs can be thus reduced down.

Additionally, it is possible to decrease the accuracy required when attaching the guide shaft and simplify the method of fixing the guide shaft with an extension of the degree of freedom for fitting.

Still further, even when the error from the design value exists in the fulcrum-to-fulcrum length of the link member because of the manufacturing error and the deformation, it is feasible to reduce the variation in the error quantity of the movable lens group in the optic axis direction in association with the error from the design value, this variation depending on the position of each movable lens group. Facilitated comparatively is the compensation involving the positional adjustment of the compensation cam member and the adjustment of the fitting position of the movable lens group in the optic axis direction.

Next, a ninth embodiment will be explained.

Manufacturing errors are present when incorporating the lens driving apparatus of the first embodiment into the actual lens barrel. Consequently, it may happen that a defocus is caused by the positional deviations of the two movable lens groups 2, 3. It is necessary for restraining this defocus within the allowable value to adjust the position of the second movable lens group 3 with respect to the first movable lens group 2. The execution of this adjustment involves an adjustment of the position of the compensation cam plate 18 and an adjustment to shift optic-axis-directional positions of lens blocks fixed to interiors of the first and second movable lens groups 2, 3.

This compensation cam plate 18 is adjustably secured to the compensation cam fixing member 17 formed integrally with the support plate 8 to adjust the position of the second movable lens group 3 as stated above. The position of the compensation cam plate 18 is thus adjusted, thereby shifting the position of the second movable lens group 3 relative to the first movable lens group 2. Adjusted is the defocus of the lens position that is produced when varying a magnification (hereinafter termed variable power) through operations of the lens system.

In the lens driving apparatus of the first embodiment shown in FIG. 1, the configuration of the cam groove 18a of the compensation cam plate 18 for compensating the approximate error of the operation quantity is not particularly prescribed.

When the lens driving apparatus of FIG. 1 is employed for a variable power mechanism, one of adjustment items is a compensation of shifting of a focus. The shifting-of-focus compensation is to compensate a deviation of a focal position to form an image in each focal length during the variable power. In this case, the position of the second movable lens group relative to the first movable lens group 2 is compensated by adjusting the position of the compensation cam plate 18. A shifting-of-focus quantity is restrained within an allowable quantity.

This shifting-of-focus compensation in terms of its nature, however, requires a compensation of only a mid-area in a variable power range in many cases. If no consideration is given to the configuration of the cam groove 18a as in the case of the lens driving apparatus of FIG. 1, it is in the great majority of cases difficult to adjust the position of the second movable lens group 3 with respect to the variable power range, particularly, the mid-area alone by adjusting the position of the compensation cam plate 18.

The ninth embodiment aims at obviating this problem.

The ninth embodiment will hereinafter be described in greater detail with reference to the drawings.

Referring to FIGS. 24 and 25, in the lens driving apparatus of this embodiment, a length and a position of each constructive member, and a rotary angle of the crank 811 and a radius of rotation of the fulcrum (connection member) of each of the link members 809, 822 are determined in accordance with the optical system so that the cam groove 818b of the compensation cam plate 818 assumes substantially an S-shape.

FIGS. 24 and 25 illustrate how the lens driving apparatus in this embodiment is incorporated into the zoom lens barrel. The crank 811 rotates, whereby the first and second movable lens groups 802, 803 are driven along the guide shaft, i.e., the optic axis through the respective link members 809, 822. The first and second movable lens groups 802, 803 are movable in a moving range from a wide-angle position W of FIG. 24 to a telephoto position T of FIG. 25. Here, a cam follower 819 moves between the position W1 of the cam groove 818b of the compensation cam plate 818 in FIG. 21 and the position T1 in FIG. 25.

With a rotation of the crank 811, the first and second movable lens groups 802, 803 are positioned at an arbitrary angle between the wide-angle position W and the telephoto position T through the link members 809, 822. Then, the position of the first movable lens group 802 is determined per angle. Furthermore, the second movable lens group 703 is positioned by the cam groove 818b of the compensation cam plate 818 through the compensation lever 820 and the link member 822 as well.

Figure 27:
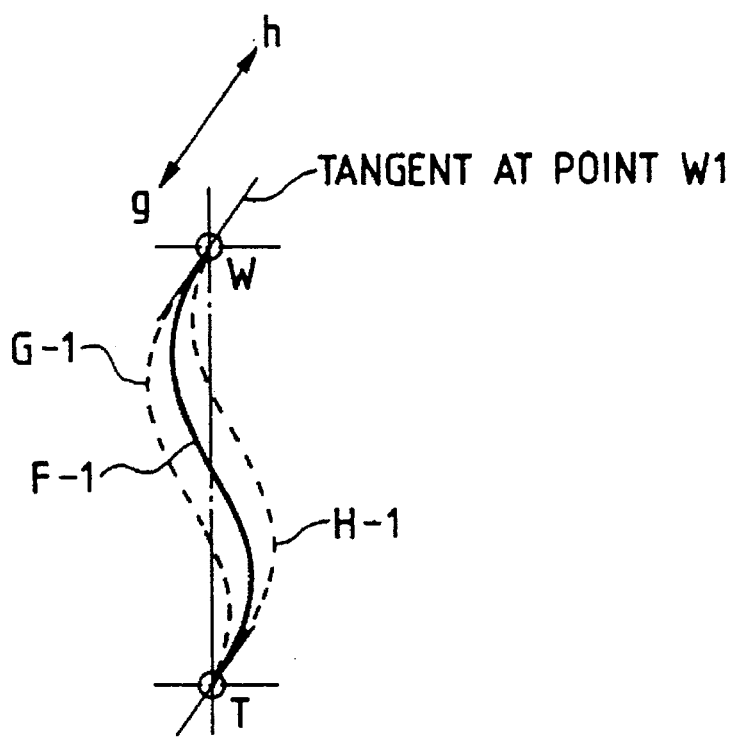
FIG. 27 is a diagram showing variations in the compensation cam plate in an adjusting direction in a ninth embodiment.

FIG. 27 is a diagram illustrating a variation in the compensation cam plate in the adjusting direction. The position of the compensation cam plate 818 is adjusted in substantially tangent directions (arrowed g- and h-directions) of the cam groove 818b in the position W1 of FIG. 24 in the driving range of the cam follower 819. A before-theadjustment position of the cam groove 818b is indicated by F-1; a g-directionally adjusted position thereof is indicated by G-1; and an h-directionally adjusted position is expressed by H-1.

Figure 28:
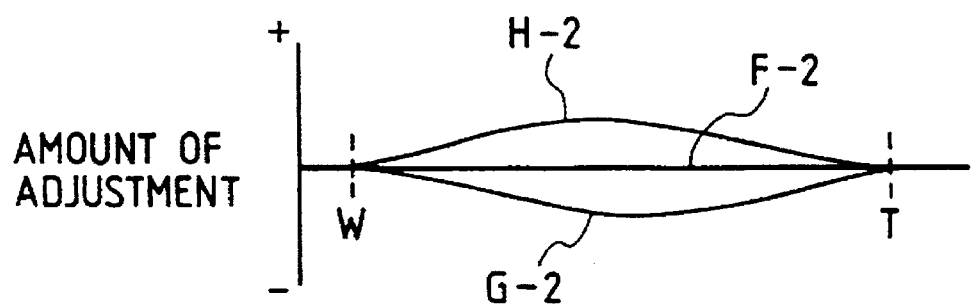
FIG. 28 is a diagram showing variations in adjustment quantity of a cam follower through the adjustment of the compensation cam plate in the ninth embodiment.

FIG. 28 is a diagram showing variations in the adjustment quantity of the cam follower through the adjustment of the compensation cam plate of this embodiment. FIG. 28 shows, when adjusting the position of the compensation cam plate 818, the adjustment quantity of the cam follower 819 through this adjustment. The symbol F-2 indicates the before-the-adjustment position of the cam groove 818b.

G-2 and H-2 express the positions of the cam groove 818b when adjusting the compensation cam plate 818 in the arrowed g- and h-directions in FIG. 27. G-2 indicates the adjustment quantity of the cam follower 819 when adjusting the compensation cam plate 818 to G-1. H-2 indicates the adjustment quantity of the cam follower 819 when adjusting the compensation cam plate 818. When adjusted in this manner, cam curves are formed in substantially parallel in the vicinities of the end points W1, T1 of the driving range of the cam follower 819. Accordingly, the adjustment quantity through the adjustment of the compensation cam plate 818 is substantially 0. The adjustment quantity can be changed by adjusting the position of the compensation cam plate 818 in the vicinity of the mid-area of the driving range.

Figure 29:
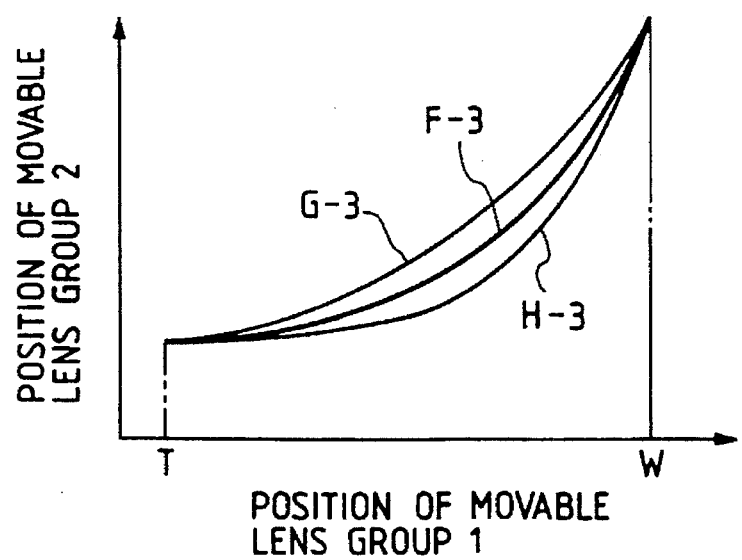
FIG. 29 is a diagram showing variations in the position of the second movable lens group relative to a position of the first movable lens group when adjusting a position of the compensation cam plate in the ninth embodiment.

FIG. 29 is a graphic chart showing variations in the position of the second movable lens group 803 relative to the position of the first movable lens group 802 when adjusting the position of the compensation cam plate in this embodiment. The symbol F-3 represents a positional relationship of the second movable lens group 803 versus the first movable lens group 802 in the F-1 state before adjusting the compensation cam plate 818. G-3 shows a positional relationship of the second movable lens group 903 versus the position of the first movable lens group 802 when adjusting the compensation cam plate 818 to G-1. H-3 indicates a positional relationship of the second movable lens group 803 versus the position of the first movable lens group 802 when adjusting the compensation cam plate 818 to H-1.

Note that FIG. 29 shows larger representations of the variation quantities with respect to G-3, H-3, F-3 than the actual ones.

In this way, the position of the compensation cam plate 818 is adjusted. The adjustment quantity through the positional adjustment of the compensation cam plate 818 is substantially zeroed in the vicinities of the end points W1, T1 of the driving range of the cam follower 819. The adjustment quantity can be thereby increased as it gets closer to the vicinity of the mid-area of the driving range. The position of the second movable lens group 803 can be adjusted by adjusting the position of the compensation cam plate 818. This is advantageous to the adjustment of the shifting of focus.

Further, the explanation of the ninth embodiment has been given, wherein the compensation cam plate 818 is adjusted in only the g- and h-directions of FIG. 27. However, the adjustment of compensation cam plate 818 may be done in combination with the conventional adjustments as shifted in the vertical/horizontal directions and rotationally shifted.

In addition, the adjustment quantity through the positional adjustment of the compensation cam plate 818 shown in FIG. 27 is exemplified in the case where the connection member 821 between the compensation lever 820 and the second movable lens group 803 is disposed in a substantially upward perpendicular direction of the cam groove 818b. When slightly deviating from the upward perpendicular direction, the adjustment quantity through the positional adjustment of the compensation cam plate 818 is somewhat different from the illustrative state. A tendency of the adjustment quantity does not, however, change largely.

As discussed above in detail, according to the ninth embodiment, the cam groove taking the substantially S-shape is employed. Accordingly, there is such an effect that it is possible to increase the degree of freedom of adjusting the positional relationship of the second movable lens group relative to the position of the first movable lens group through the positional adjustment of the compensation cam plate.

It is apparent that, in this invention, a wide range of different working modes can be formed based on the invention without deviating from the spirit and scope of the invention. This invention is not restricted by its specific working modes except being limited by the appended claims.

What is claimed is:

1. An apparatus for driving a lens, comprising:
   first and second movable lens groups movable along an optic-axis direction;
   a crank member for moving said first and second movable lens groups along the optic-axis direction in a predetermined mutual relationship;
   first moving means for moving said first movable lens group along the optic-axis direction by a force received from said crank member;
   second moving means for moving said second movable lens group along the optic-axis direction by the force received by said crank member; and
   a compensating device, compensating a deviation quantity of said second movable lens group from a predetermined moving quantity, having a compensation lever with one end rotatably connected to said second movable lens group, a cam follower disposed at the other end of said compensation lever and a cam member formed with a cam groove for guiding said cam follower.

2. The apparatus according to claim 1, wherein said first moving means is a slider crank mechanism.

3. The apparatus according to claim 2, wherein said slider crank mechanism comprises a guide shaft for moving said first movable lens group along the optic-axis direction and a link member having one end rotatably linked to said first movable lens group and the other end rotatably linked to said crank member.

4. The apparatus according to claim 3, further comprising a torsion member, provided in a connection part between said first movable lens group and said link member and in a connection part between said crank member and said link member, for restraining a backlash in the connection part.

5. The apparatus according to claim 1, wherein said second moving means is a slider crank mechanism.

6. The apparatus according to claim 5, wherein said slider crank mechanism comprises a guide shaft for moving said second movable lens group along the optic axis direction and a link member having one end rotatably linked to said compensating means and the other end rotatably linked to said crank member.

7. The apparatus according to claim 1, further comprising a holding member for holding said cam member in a predetermined positioned with respect to the optic-axis.

8. The apparatus according to claim 7, wherein said holding member comprises an adjusting means for adjusting a position of said cam member relative to the optic-axis.

9. The apparatus according to claim 7, wherein said holding member holds said cam member in a replaceable manner.

10. The apparatus according to claim 1, wherein a moving velocity of said first movable lens group is higher than a moving velocity of said second movable lens group.

11. The apparatus according to claim 1, wherein said crank member has a balancer.

12. The apparatus according to claim 1, further comprising a motor for rotating said crank member.

13. The apparatus according to claim 12, wherein a motor shaft of said motor is fixed directly to said crank member.

14. The apparatus according to claim 12, further comprising a control means for performing open-loop control over said motor.

15. The apparatus according to claim 12, further comprising a rotary angle detecting device for detecting a rotation of the motor shaft.

16. The apparatus according to claim 12, further comprising a rotation preventing means for preventing the rotation of said motor itself.

17. The apparatus according to claim 1, further comprising a position adjusting means for adjusting a fitting position of said first moving means to said first movable lens group.

18. The apparatus according to claim 17, further comprising an amount-of-compensation storing means for storing an amount of compensation of the fitting position of said first moving means to said first movable lens group, corresponding to a position of said first movable lens group and a positional adjustment driving means for driving said position adjusting means on the basis of the amount of compensation which is stored in said amount-of-compensation storing means.

19. The apparatus according to claim 18, further comprising a temperature detecting means for detecting a temperature of an environment used, wherein said amount-of-compensation storing means further stores the amount of compensation with respect to the temperature, and said positional adjustment driving means drives said position adjusting means on the basis of the amount of compensation corresponding to the temperature detected by said temperature detecting means.

20. The apparatus according to claim 1, further comprising a position adjusting means for adjusting a fitting position of said compensating device to said second movable lens group.

21. The apparatus according to claim 20, further comprising an amount-of-compensation storing means for storing an amount of compensation of the fitting position of said compensating device to said second movable lens group, corresponding to the position of said first movable lens group and a positional adjustment driving means for driving said position adjusting means on the basis of the amount of compensation which is stored in said amount-of-compensation storing means.

22. The apparatus according to claim 21, further comprising a temperature detecting means for detecting a temperature of an environment used, wherein said amount-of-compensation storing means further stores the amount of compensation with respect to the temperature, and said positional adjustment driving means drives said position adjusting means on the basis of the amount of compensation corresponding to the temperature detected by said temperature detecting means.

23. The apparatus according to claim 1, further comprising a position adjusting means for adjusting a fitting position of said second moving means to said compensating device.

24. The apparatus according to claim 23, further comprising an amount-of-compensation storing means for storing an amount of compensation of the fitting position of said second moving means to said compensating device, corresponding to the position of said first movable lens group and a positional adjustment driving means for driving said position adjusting means on the basis of the amount of compensation which is stored in said amount-of-compensation storing means.

25. The apparatus according to claim 24, further comprising a temperature detecting means for detecting a temperature of an environment used, wherein said amount-of-compensation storing means further stores the amount of compensation with respect to the temperature, and said positional adjustment driving means drives said position adjusting means on the basis of the amount of compensation corresponding to the temperature detected by said temperature detecting means.

26. The apparatus according to claim 1, wherein said first moving means has a first link member having one end rotatably linked to said first movable lens group and the other end rotatably linked to said crank member, the lens driving apparatus further comprising a length adjusting means for adjusting a length of said first link member.

27. The apparatus according to claim 26, further comprising an amount-of-compensation storing means for storing an amount of compensation of the length of said first link member, corresponding to the position of said first movable lens group and a length adjustment driving means for driving said length adjusting means on the basis of the amount of compensation which is stored in said amount-of-compensation storing means.

28. The apparatus according to claim 27, further comprising a temperature detecting means for detecting a temperature of an environment used, wherein said amount-of-compensation storing means further stores the amount of compensation with respect to the temperature, and said length adjustment driving means drives said length adjusting means on the basis of the amount of compensation corresponding to the temperature detected by said temperature detecting means.

29. The apparatus according to claim 1, wherein said second moving means has a second link member having one end rotatably linked to said compensating device and the other end rotatably linked to said crank member, said lens driving apparatus further comprising a length adjusting means for adjusting a length of said second link member.

30. The apparatus according to claim 29, further comprising an amount-of-compensation storing means for storing an amount of compensation of the length of said second link member, corresponding to the position of said first movable lens group and a length adjustment driving means for driving said length adjusting means on the basis of the amount of compensation which is stored in said amount-of-compensation storing means.

31. The apparatus according to claim 30, further comprising a temperature detecting means for detecting a temperature of an environment used, wherein said amount-of-compensation storing means further stores the amount of compensation with respect to the temperature, and said length adjustment driving means drives said length adjusting means on the basis of the amount of compensation corresponding to the temperature detected by said temperature detecting means.

32. The apparatus according to claim 1, further comprising an amount-of-compensation storing means for storing an amount of compensation of the portion of said cam member, corresponding to the position of said first movable lens group and a cam member driving means for driving said cam member on the basis of the amount of compensation which is stored in said amount-of-compensation storing means.

33. The apparatus according to claim 32, wherein said cam member driving means drives said cam member so that said second movable lens group make a micro-movement in the optic-axis direction.

34. The apparatus according to claim 32, further comprising a temperature detecting means for detecting a temperature of an environment used, wherein said amount-of-compensation storing means further stores the amount of compensation with respect to the temperature, and said cam member driving means drives said cam member on the basis of the amount of compensation corresponding to the temperature detected by said temperature detecting means.

35. The apparatus according to claim 1, wherein the compensation lever is rotatably connected to said second movable lens group in a predetermined connecting position, wherein said second moving means includes a guide shaft for moving said second movable lens group along the optic-axis direction and a link member having one end rotatably linked to said compensation lever and the other end rotatably lined to said crank member, and wherein the cam groove has a cam curve perpendicular to a trajectory plane of said compensation lever, parallel to a moving axial line of said second movable lens group and disposed substantially on a plane including the predetermined connecting position of said compensation lever to said second movable lens group.

36. The apparatus according to claim 1, wherein the compensation lever is rotatably connected to said second movable lens group in a predetermined connecting position, and wherein the cam groove has a cam curve formed in a position having a distance substantially equal to a distance from the optic axis to the predetermined connecting position.

37. The apparatus according to claim 1, wherein said first moving means has a first link member rotatably linked to said first movable lens group at a first fulcrum and rotatably linked to said crank member at a second fulcrum, wherein a line passing through the first and second fulcrums of said first link member intersects the moving axial line of said first movable lens group in such a range as to make a substantially small angle in an entire or some area within a driving range of said first link member, wherein said second moving means has a second link member rotatably linked to said compensating device at a third fulcrum and rotatably linked to said crank member at a fourth fulcrum, and wherein a line passing through the third fulcrum and rotatably linked to said crank member at the fourth fulcrum, and wherein a line passing through the third and fourth fulcrums of said second link member intersects the moving axial line of said second movable lens group in such a range as to make a substantially small angle in an entire or some area within the driving range of said second link member.

38. The apparatus according to claim 1, wherein said first moving means has a first link member rotatably linked to said first movable lens group at a first fulcrum and rotatably linked to said crank member at a second fulcrum, and a line passing through the first and second fulcrums of said first link member intersects the moving axial line of said first movable lens group in such a range as to make a substantially small angle in the entire or some area within the driving range of said first link member.

39. The apparatus according to claim 1, wherein said second moving means has a second link member rotatably linked to said compensating device at a first fulcrum and rotatably linked to said crank member at a second fulcrum, and a line passing through the first and second fulcrums of said second link member intersects the moving axial line of said second movable lens group in such a range as to make a substantially small angle in the entire or some area within the driving range of said second link member.

40. The apparatus according to claim 1, wherein said first moving means has a first link member rotatably linked to said first movable lens group at a first fulcrum and rotatably linked to said crank member at a second fulcrum, wherein a line passing through the first and second fulcrums of said first link member intersects the moving axial line of said first movable lens group in such a range as to make a substantially small angle including a parallel state in the entire or some area within the driving range of said first link member, wherein said second moving means has a second link member rotatably linked to said compensating device at a third fulcrum and rotatably linked to said crank member at a fourth fulcrum, and wherein a line passing through the third and fourth fulcrums of said second link member intersects the moving axial line of said second movable lens group in such a range as to make a substantially small angle including a parallel state in the entire or some area within the driving range of said second link member.

41. The apparatus according to claim 1, wherein said second moving means includes a guide means for moving said second movable lens group along the optic-axis direction and a link member having one end rotatably linked to said compensation lever and the other end rotatably linked to said crank member, and wherein a cam configuration of the cam groove of said cam member is a substantially S-shape.

42. The apparatus according to claim 41, wherein a tangential line to a point at which said cam follower engages with the substantially S-shaped cam groove is substantially parallel when said second movable lens group is at a wide-angle end and a telephoto end, and said cam member is movable in the tangent direction to compensate the deviation quantity of said second movable lens group from the predetermined moving quantity.

43. An apparatus for driving a lens, comprising:

first and second movable lens groups movable along an optic-axis direction;

a crank member for moving said first and second movable lens groups along the optic-axis direction in a predetermined mutual relationship;

first moving means for moving said first movable lens group along the optic-axis direction by a force received from said crank member;

second moving means for moving said second movable lens group along the optic-axis direction by the force received by said crank member; and a compensating device, compensating a deviation quantity of said second movable lens group from a predetermined moving quantity, having a compensation lever with one end rotatably connected to said second movable lens group, a cam follower disposed at the other end of said compensation lever and a cam member formed with a cam groove for guiding said cam follower, and wherein said second moving means has a guide shaft for moving said second movable lens group along the optic-axis direction and a link member with one end rotatably linked to said compensation lever and the other end rotatably linked to said crank member.

44. An apparatus for driving a lens, comprising:

first and second movable lens groups movable along an optic-axis;

a moving device for moving said first and second movable lens groups, said moving device having a link device rotatably connected to said first and second movable lens group; and, a compensating device, providing a deviation quantity in a predetermined moving quantity of said second movable lens group, having a compensating lever with one end rotatably connected to said second movable lens group and a cam follower disposed at the other end, and a cam member having a cam groove for guiding the cam follower.

45. The apparatus according to claim 44, further comprising a holding member for holding said cam member in a predetermined position with respect to the optic-axis.

46. The apparatus according to claim 45, wherein said holding member comprises an adjusting means for adjusting a position of said cam member relative to the optic-axis.

* * * * *

UNITED STATES PATENT AND TRADEMARK OFFICE
CERTIFICATE OF CORRECTION

PATENT NO. : 5,636,062

DATED : June 3, 1997

INVENTOR(S) : Okuyama et al.

It is certified that error appears in the above-indentified patent and that said Letters Patent is hereby corrected as shown below:

Col. 32, line 64 (claim 7), "positioned" should be --position--.

Col. 34, line 67 (claim 32), "portion" should be --position--.

Col. 35, line 24 (claim 35), "lined" should be --linked--.

Signed and Sealed this

Ninth Day of December, 1997

Attest:

BRUCE LEHMAN

*Attesting Officer*　　　*Commissioner of Patents and Trademarks*